(12) United States Patent
Chen et al.

(10) Patent No.: US 11,321,393 B2
(45) Date of Patent: *May 3, 2022

(54) DISTRIBUTED GRAPH DATABASES THAT FACILITATE STREAMING DATA INSERTION AND QUERIES BY REDUCING NUMBER OF MESSAGES REQUIRED TO ADD A NEW EDGE BY EMPLOYING ASYNCHRONOUS COMMUNICATION

(71) Applicant: International Business Machines Corporation, Armonk, NY (US)

(72) Inventors: Chun-Fu Chen, Elmsford, NY (US); Jason L. Crawford, Katonah, NY (US); Ching-Yung Lin, Scarsdale, NY (US); Jie Lu, Westchester, NY (US); Mark R. Nutter, Austin, TX (US); Toyotaro Suzumura, New York, NY (US); Ilie G. Tanase, Somers, NY (US); Danny L. Yeh, Tarrytown, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 315 days.

This patent is subject to a terminal disclaimer.

(21) Appl. No.: 16/436,319

(22) Filed: Jun. 10, 2019

(65) Prior Publication Data
US 2019/0294634 A1    Sep. 26, 2019

Related U.S. Application Data

(63) Continuation of application No. 15/230,000, filed on Aug. 5, 2016, now Pat. No. 10,380,188.

(51) Int. Cl.
*G06F 16/00*    (2019.01)
*G06F 16/901*    (2019.01)
(Continued)

(52) U.S. Cl.
CPC .......... *G06F 16/9024* (2019.01); *G06F 9/547* (2013.01); *G06F 16/24568* (2019.01); *G06F 16/28* (2019.01); *G06F 16/9535* (2019.01)

(58) Field of Classification Search
CPC .............. G06F 16/24568; G06F 16/28; G06F 16/9024; G06F 16/9535; G06F 16/547
(Continued)

(56) References Cited

U.S. PATENT DOCUMENTS 7,644,142 B2    1/2010    Chen et al.
7,844,959 B2    11/2010    Isard
(Continued)

OTHER PUBLICATIONS

Appendix P: List of IBM Patents or Applications Treated as Related.
(Continued)

*Primary Examiner* — Vincent F Boccio
(74) *Attorney, Agent, or Firm* — Amin, Turocy & Watson, LLP

(57) ABSTRACT

A novel distributed graph database is provided that is designed for efficient graph data storage and processing on modern computing architectures. In particular a single node graph database and a runtime & communication layer allows for composing a distributed graph database from multiple single node instances.

20 Claims, 22 Drawing Sheets

```
1  add_edge("A","Knows","B")
2   VIDS=check_or_create(A)
3   VIDT=check_or_create(B)
4   ID=check_or_create_lid(Knows)
5   ID=add_outgoing_edge(VIDS,VIDT,LID)
6    add_incoming_edge(VIDT,VIDS,EID,LID)
```

Add edge steps

(51) Int. Cl.
*G06F 16/9535* (2019.01)
*G06F 16/2455* (2019.01)
*G06F 16/28* (2019.01)
*G06F 9/54* (2006.01)

(58) Field of Classification Search
USPC .......................................................... 707/798
See application file for complete search history.

(56) References Cited

U.S. PATENT DOCUMENTS

| | | | |
|---|---|---|---|
| 7,984,043 | B1 | 7/2011 | Waas |
| 8,166,479 | B2 | 4/2012 | Roberts et al. |
| 8,555,385 | B1 | 10/2013 | Bhatkar et al. |
| 8,631,094 | B1 | 1/2014 | Alpert et al. |
| 9,552,265 | B2 | 1/2017 | Saito et al. |
| 9,697,475 | B1 | 7/2017 | Subramanya et al. |
| 10,394,891 | B2 | 8/2019 | Chen et al. |
| 2004/0078780 | A1 | 4/2004 | Dutt et al. |
| 2005/0256893 | A1 | 11/2005 | Perry |
| 2007/0220059 | A1 | 9/2007 | Lu et al. |
| 2008/0098375 | A1 | 4/2008 | Isard |
| 2010/0146291 | A1 | 6/2010 | Anbuselvan |
| 2010/0205673 | A1 | 8/2010 | Burrell et al. |
| 2011/0216689 | A1 | 9/2011 | Jenkins et al. |
| 2012/0078951 | A1 | 3/2012 | Hsu et al. |
| 2012/0185936 | A1 | 7/2012 | Lakshminarayanan |
| 2012/0198555 | A1 | 8/2012 | Beskrovny et al. |
| 2012/0222123 | A1 | 8/2012 | Williams et al. |
| 2012/0310916 | A1 | 12/2012 | Abadi et al. |
| 2013/0318613 | A1 | 11/2013 | Archer et al. |
| 2014/0172914 | A1 | 6/2014 | Elnikety et al. |
| 2014/0359776 | A1 | 12/2014 | Liu |
| 2014/0372486 | A1* | 12/2014 | Bose ............... G06F 16/27 707/792 |
| 2015/0281257 | A1 | 10/2015 | Hart et al. |
| 2015/0288705 | A1 | 10/2015 | Ligman et al. |
| 2015/0339158 | A1 | 11/2015 | Harris et al. |
| 2016/0021041 | A1 | 1/2016 | Zacharias et al. |
| 2016/0112451 | A1 | 4/2016 | Jevans |
| 2016/0189119 | A1 | 6/2016 | Bowman et al. |
| 2017/0034654 | A1 | 2/2017 | Oberbeck et al. |
| 2017/0177699 | A1 | 6/2017 | Chan |
| 2018/0039673 | A1* | 2/2018 | Chen ............... G06F 16/9024 |
| 2018/0039709 | A1* | 2/2018 | Chen ............... G06F 16/9024 |

OTHER PUBLICATIONS

Notice of allowance received for U.S. Appl. No. 15/274,364 dated Jun. 3, 2019, 62 pages.
Kim et al., "Vulnerability detection mechanism based on open API for multi-user's convenience", 2016 International Conference on Information Networking (ICOIN) works, 2016, pp. 458-462.
Tang et al., "Multi-factor web API security for securing Mobile Cloud", 2015 12th International Conference on Fuzzy Systems and Knowledge Discovery (FSKD), 2015, pp. 2163-2168.
Non-Final Office Action received for U.S. Appl. No. 16/422,021 dated Jun. 10, 2021, 36 pages.
Aurelius, "Bulk Loading, Chapter 29", URL: http://s3thinkaurelius.com/docs/titan/0_5_4/bulk-loading_html, last accessed on Aug. 2, 2016, 5 pages.
List of IBM Patents or Applications treated as related.
Non-Final Office Action received for U.S. Appl. No. 15/274,364 dated Aug. 3, 2018, 36 pages.
Kontaxis et al., "An empirical study on the security of cross-domain policies in rich internet applications", Proceedings of the Fourth European Workshop on System Security, ACM, Apr. 10, 2011, 6 pages.
Lahteenmaki, Jarno, "Scenario based security evaluation: Generic OpenFiow network", Aalto University School of Electrical Engineering, 2014, 39 pages.
Author Unknown, "Static Extraction of URLs from Android Applications", URL: http://www.rapid7.com/products/metasploil/, last accessed on Aug. 24, 2016, 12 pages.
rapid7.com, "Metasploit: Put Your Defenses to the Test", last accessed on Aug. 29, 2016, 12 pages.
coalfire.com, "Penetration Testing Services", URL: http://www.coalfire.com/Solutions/Coalfire-Labs/Penetration-Tests, last accessed on Aug. 29, 2016, 4 pages.
owasp.org, "Cross-site Scripting (XSS)", URL: https:/lwww.owasp.org/index.php/Cross-site_Scripling_%28XSS%29, last accessed on Aug. 29, 2016, 8 pages.
Mutchler et al., "A Large-Scale Study of Mobile Web App Security", URL: http://ieee-security.org/TC/SPW2015/MoST/papers/s2p3.pdf., last accessed on Aug. 29, 2016, 11 pages.
Pieczul, et al., "Discovering Emergent Nonms in Security Logs", 6th Symposium on Security Analytics and Automation, IEEE, 2013, 8 pages.
Probst et al., "An Automated Approach for the Analysis of Network Access Controls in Cloud Computing Infrastructures", URL: http://citeseerx.isl.psu.edu/viewdoc/download?doi=10.1.1.724.2534&rep=rep1&type=pdf., last accessed on Aug. 29, 2016, 14 pages.
Ullah et al., "Towards Building an Automated Security Compliance Tool for the Cloud", 12th IEEE International Conference on Trust, Security and Privacy in Computing and Communications, 2013, 7 pages.
Zahid et al., "Security of Sharded NoSQL Databases: A Comparative Analysis", Conference on Information Assurance and Cyber Security (CIACS), 2014, pp. 1-8.
Non-Final Office Action received for U.S. Appl. No. 15/230,054 dated Sep. 21, 2018, 33 pages.
Final Office Action received for U.S. Appl. No. 15/274,364 dated Nov. 27, 2018, 41 pages.
Non-Final Office Action received for U.S. Appl. No. 15/230,000 dated Nov. 2, 2018, 231 pages.
Non-Final Office Action received for U.S. Appl. No. 15/230,071 dated Jan. 14, 2019, 34 pages.
Non-Final Office Action received for U.S. Appl. No. 16/422,021 dated Nov. 29, 2021, 13 pages.
Non-Final Office Action received for U.S. Appl. No. 16/551,823 dated Sep. 23, 2021, 40 pages.

* cited by examiner

```
 1  class rpc_wf : public ibmppi::work_function{
 2      Args args;
 3  public:
 4      rpc_wf(Args a): args(a){}
 5      virtual void execute(ibmppi::thread_id_t thread
            ibmppi::task_id tid){
 6          // task body: Data of reference to the data to
 7          // be processed is found in args variable(s)
 8      }
 9  };
10  main(){
11      ::scheduler_init( num_threads );
12      Args task_args;
13      for( int i=0;i<N;++i ){
14          rpc_wf wf(task_args);
15          ::default_scheduler().schedule(&wf);
16      }
17      // Expressing tasks using lambda functions
18      ibmppi::execute_tasks(N,
19          [&]( size_t this, size_t tid ){
20          // task has access to local variables
21          // identifying the thread and task
22          // it can also access variables from the
23          // outer scope like task_args
24      }
25  };
```

Runtime scheduler

FIG. 3

```
1  struct rpc_args {
2      // data to be sent
3      double data;
4      // return address
5      intptr_t ret_addr;
6      // location where the request originated
7      size_t location;
8
9      rpc_args(double d, intptr_t ra, size_t l=0) :
10         data(d), ret_addr(ra), location(l) {}
11     friend class cereal::access;
12     template<class Archive>
13     void serialize(Archive & ar, const unsigned int version){
14         ar & data;
15         ar & ret_addr;
16         ar & location;
17     }
18 };
19
20 void rpc_func(rpc_args arg){ ... }
21
22 void i_rpc_func(size_t sender, char* archive, size_t nbytes){
23     rpc_args tmp_args;
24     thapppi::serdes<rpc_args>::deserialize(archive, nbytes, tmp_args);
25     rpc_func(cid, &tmp_args);
26 }
27
28 main() {
29     thapppi::register_rpc(rpc_func, &i_rpc_func);
30     ...
31     double ret_val =0;
32     rpc_args arg(data, (intptr_t)&ret_val, node_id);
33     RPC(node_id+1,#enum_nodes, &i_rpc_func, arg);
34     // wait for token to be passed back
35     while (!ret_val){
36         thapppi::get_rpc_manager().advance();
37     }
38 }
```

FIG. 4

System G Native Store Graph Interface

```
 1  BFS(distributed_graphs dg, id_type vid, int max_depth){
 2    Partitioned_frontier frontier;
 3    frontier.insert(vid);
 4    d=0;
 5    while(d<depth && frontier.size()>0){
 6      for(idx_i mid=0;mid<frontier.locations();++mid){
 7        vector<id_type>& curr = frontier.location->get_verts(mid);
 8        if(curr.size()>0){
 9          dg->get_all_edges_async(curr, new_verts[mid]);
10        }
11      }
12      //in a second phase we wait for data to come back
13      for(idx_i mid=0;mid<frontier.locations();++mid){
14        vector<idx_t>& curr = frontier.location->get_verts(mid);
15        if(curr.size()>0){
16          while(new_verts[mid].second == 0){
17            dg->poll(); //wait for vertices to come back
18          }
19          //process the newly arrived vertices
20          for(idx_i j=0;j<new_verts[mid].first.size();++j){
              ...
            }
          }
        }
      }
```

Fixed depth BFS

FIG. 5

```
1  add_edge("A", "Knows", "B")
2  VIDS=check_or_create(A)
3  VIDT=check_or_create(B)
4  ID=check_or_create_iid(Knows)
5  ID=add_outgoing_edge(VIDS, VIDT, LID)
6  add_incoming_edge(VIDT, VIDS, EID, LID)
```

Add edge steps

FIG. 6

Distributed graph example

External to Internal
Gabi 0
Doug 1
Mark 7

Adjacency: Outgoing edges
{1,43,0}{7,20}... up to n
1 {7,43,0}...

Adjacency: Incoming edges
{0,44,0}...
7 {0,42,0}{1,43,0}

Single Node

---

Gabi 0

Adjacency: Outgoing edges
{1,43,0}{7,20}...

Adjacency: Incoming edges

Machine0

---

Doug 1
Mark 7

Adjacency: Outgoing edges
1 {7,43,0}...

Adjacency: Incoming edges
1 {0,44,0}
7 {0,42,0}{1,43,0}

Machine1

Distributed

FIG. 10

Simple add edge in a distributed database

BASIC Algorithm

- Send request Machine0 to add source "Gabi" (1)
  - Wait for VIDS to be returned from Machine0 (2)
- Send request to Machine1 to add target "Doug" (3)
  - Wait for VIDT to be returned from Machine1 (4)
- Send request to Machine0 to add out going edge from VIDS to VIDT. This will add the quad {VIDS, VIDT, LID, MAXEID} to the outgoing edges of Machine0 (5)
  - Increment the MAXEID variable on the Machine0
  - Return the EID used for this edge back to the requestor (6)
- Send request to Machine1 to add incoming edge from VIDS to VIDT using the EID generated in the previous step (7)
  - Add {VIDT,VIDS,LID,EID} to the list of incoming edges on Machine 1
- The algorithm above performs a maximum of seven communication steps per add edge request

```
add_edge("Gabi","Knows","Doug")
    tx_begin()
    VIDS = check_or_create("Gabi")
    VIDT = check_or_create("Doug")
    LID = check_or_create_lid("Knows")
    EID = add_outgoing_edge(VIDS,VIDT,LID)
    add_incoming_edge(VIDT, VIDS, EID,LID)
    tx_end()
add_edge("Gabi","Knows","Mark")
```

FIG. 11

METHODOLOGY 1

*Method to reduce the number of messages required to add a new edge by using asynchronous communication*

- Send request (("Gabi","knows","Doug")) to Machine1 to add target "Doug" (1)
- Machine1 adds "Doug" generating an unique VIDT and forwards (("Gabi","knows",VIDT)) to Machine0 (2)
- Machine0 adds vertex "Gabi", generating the corresponding VIDS
  - Add the outgoing edge (VIDS,VIDT,LID,MAXEID)
  - Increment MAXEID
  - Forward (VIDS,VIDT,LID,MAXEID-1) to Machine1 (3)
- Machine1 adds incoming edge

- The algorithm above performs a maximum of 3 communication steps per add edge request
  - Down from 7 in the basic algorithm add_edge("Gabi","Knows","Doug")
  VIDS = check_or_create("Gabi")
  VIDT = check_or_create("Doug")
  LID = check_or_create_lid("Knows")
  EID = add_outgoing_edge(VIDS,VIDT,LID)
  add_incoming_edge(VIDT,VIDS,EID,LID)

add_edge("Gabi","Knows","Mark")

FIG. 12

METHODOLOGY 2
STEP 1

- Decide vertex placement
  - Based on a hash or an arbitrary placement function
- Place edge requests into appropriate queues of the firehose
- Place incoming edge requests into appropriate queues of the firehose

**METHODOLOGY 2
STEP 2**

- For each queue, in parallel
  - Send requests to add vertices for
    - All sources in the Edges set
    - All targets in the Incoming set
  - Wait for the vertex ids of all added vertices and the MAXEID from each Machine, respectively

METHODOLOGY 2
STEP 3

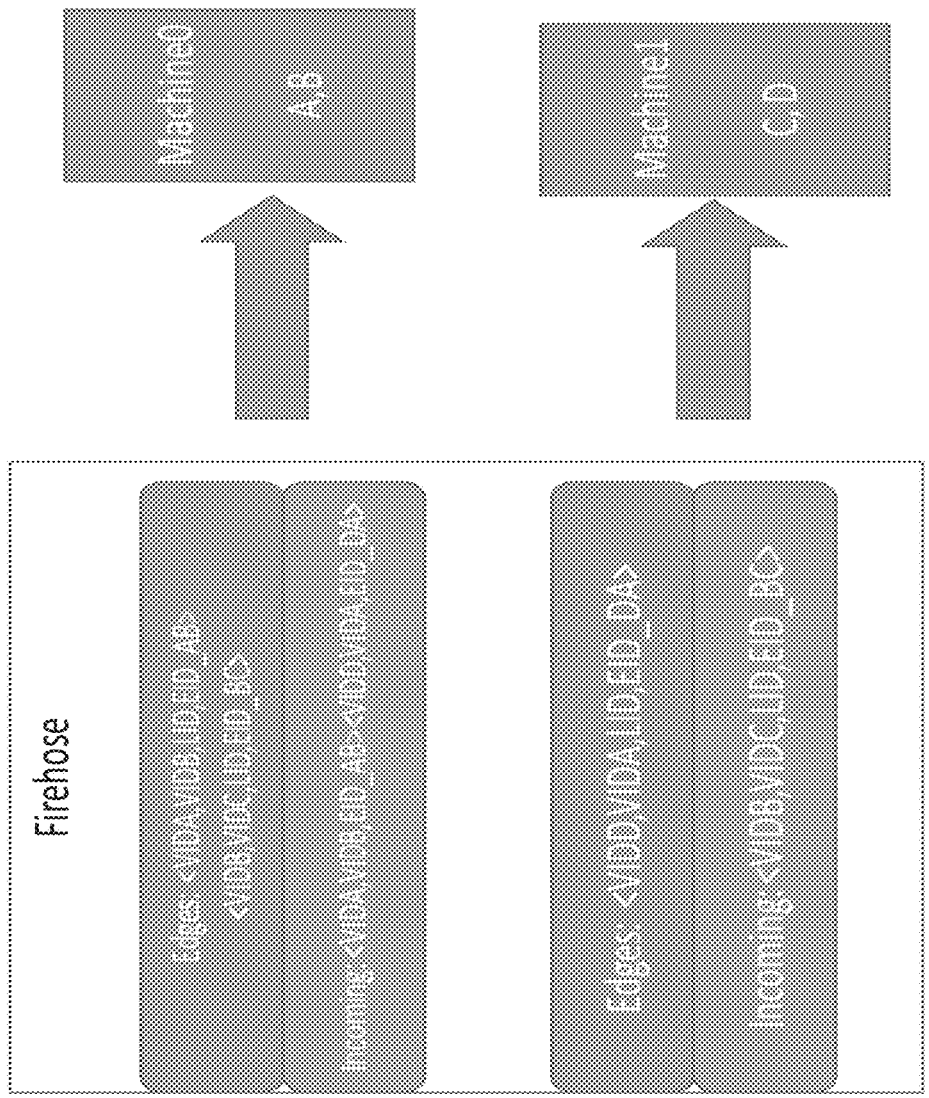

- For all vertices added insert into a map (hash table) the pairing <A,VIDA>, <B,VIDB>, <C,VIDC> and <D,VIDD>
- For all outgoing and incoming edges map from external ids to internal ids and edge identifiers
- Send edge quads to the machines to be inserted

- In average this reduces the number of messages per batch of edges to three. Given N edges to be added the basic approach will cause 7*N messages, Claim 1 will bring it down 3*N while Claim 2 will bring it down to 3.

FIG. 17

METHODOLOGY 3

Query Manager

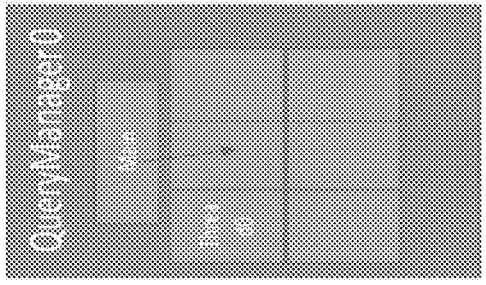

- Method to provide low latency graph queries

- A query manager will be in charge of performing the graph queries (various graph traversals)

- Manages multiple threads of execution to handle multiple concurrent queries from client

- For a complete traversal a thread running on the query manager may perform multiple requests to various shards during multiple waves corresponding to the traversal levels

- The thread will maintain all the partial results until the traversal finishes (max depth, max nodes, max time allowed) and then return results to clients

- Additional Query Managers can be instantiated to accommodate increasing load

FIG. 19

DISTRIBUTED GRAPH DATABASES THAT FACILITATE STREAMING DATA INSERTION AND QUERIES BY REDUCING NUMBER OF MESSAGES REQUIRED TO ADD A NEW EDGE BY EMPLOYING ASYNCHRONOUS COMMUNICATION

BACKGROUND

The subject disclosure relates to database systems, and more specifically, to distributed graph databases that facilitate streaming data insertion and queries.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, devices, systems, computer-implemented methods, apparatus and/or computer program products that facilitate distributed graph databases for streaming data insertion and queries are described.

According to an embodiment, a computer-implemented method to reduce number of messages required to add a new edge by employing asynchronous communication, comprises: using a processor, operatively coupled to at least one memory, to execute the following acts: receiving a request at a first machine to add a first target; adding the first target at the first machine, generating a unique VIDT, and forwarding the VIDT to a second machine wherein the second machine adds a vertex, and generates a corresponding VIDS, comprising the acts of: Prepare EID as {ShardID, MAXEID}, incrementing MAXEID; adding an outgoing edge {VIDS, VIDT, LID, EID}; forwarding {VIDS,VIDT, LID,EID} to the first machine; and adding at the first machine the incoming edge.

In another embodiment, a computer-implemented method for efficient throughput edge addition, comprises: using a processor, operatively coupled to at least one memory, to execute the following acts: determine vertex placement, based on a hash or an arbitrary placement function; place outgoing edge requests into appropriate queues of a firehose; and place incoming edge requests into appropriate queues of the firehose, wherein for each queue, in parallel: send requests to add vertices for all sources in an outgoing edges set, and all targets in an incoming edges set, and wait for vertex ids of all added vertices and MAXEID from each machine, respectively. Build the final edge tuples for each queue in the form of {YIDS, VIDT, LID, EID} based on the yids returned and insert the outgoing and incoming edge tuples and their corresponding shards.

In yet another embodiment, a method to provide low latency graph queries, comprises: using a processor, operatively coupled to at least one memory, to execute the following acts: employing a query manager to perform graph queries; and employing the query manager to manage multiple threads of execution to handle multiple concurrent queries from one or more clients; wherein for a complete traversal, a thread running on the query manager performs multiple requests to various shards during multiple waves corresponding to traversal levels, and wherein the thread will maintain all partial results until the traversal finishes (max depth, max nodes, max time allowed) and then return results to clients.

In some embodiments, elements described in connection with the computer-implemented method(s) can be embodied in different forms such as a system, a computer program product, or another form.

DESCRIPTION OF THE DRAWINGS

FIG. 3 illustrates example, non-limiting pseudocode for a basic usage of runtime scheduler application programming interfaces (APIs) in accordance with one or more embodiments described herein.

FIG. 4 illustrates example, non-limiting pseudocode in accordance with one or more embodiments described herein.

FIG. 5 illustrates example, non-limiting pseudocode for fixed depth breadth first search (BFS) in accordance with one or more embodiments described herein.

FIG. 6 illustrates example, non-limiting pseudocode to facilitate adding edge steps in accordance with one or more embodiments described herein.

FIG. 10 illustrates an example, non-limiting distributed graph in accordance with one or more embodiments described herein.

FIG. 11 illustrates example, non-limiting pseudode for simple add edge in a distributed database in accordance with one or more embodiments described herein.

FIGS. 12 and 13 illustrate example, non-limiting methods to reduce the number of messages required to add a new edge by using asynchronous communication in accordance with one or more embodiments described herein.

FIGS. 14-18 illustrate example, non-limiting methods to facilitate high throughput edge addition with batched solution using the firehose in accordance with one or more embodiments described herein.

FIGS. 19-20 illustrate example, non-limiting methods of query manager operation in accordance with one or more embodiments described herein.

DETAILED DESCRIPTION

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

Figure 1:
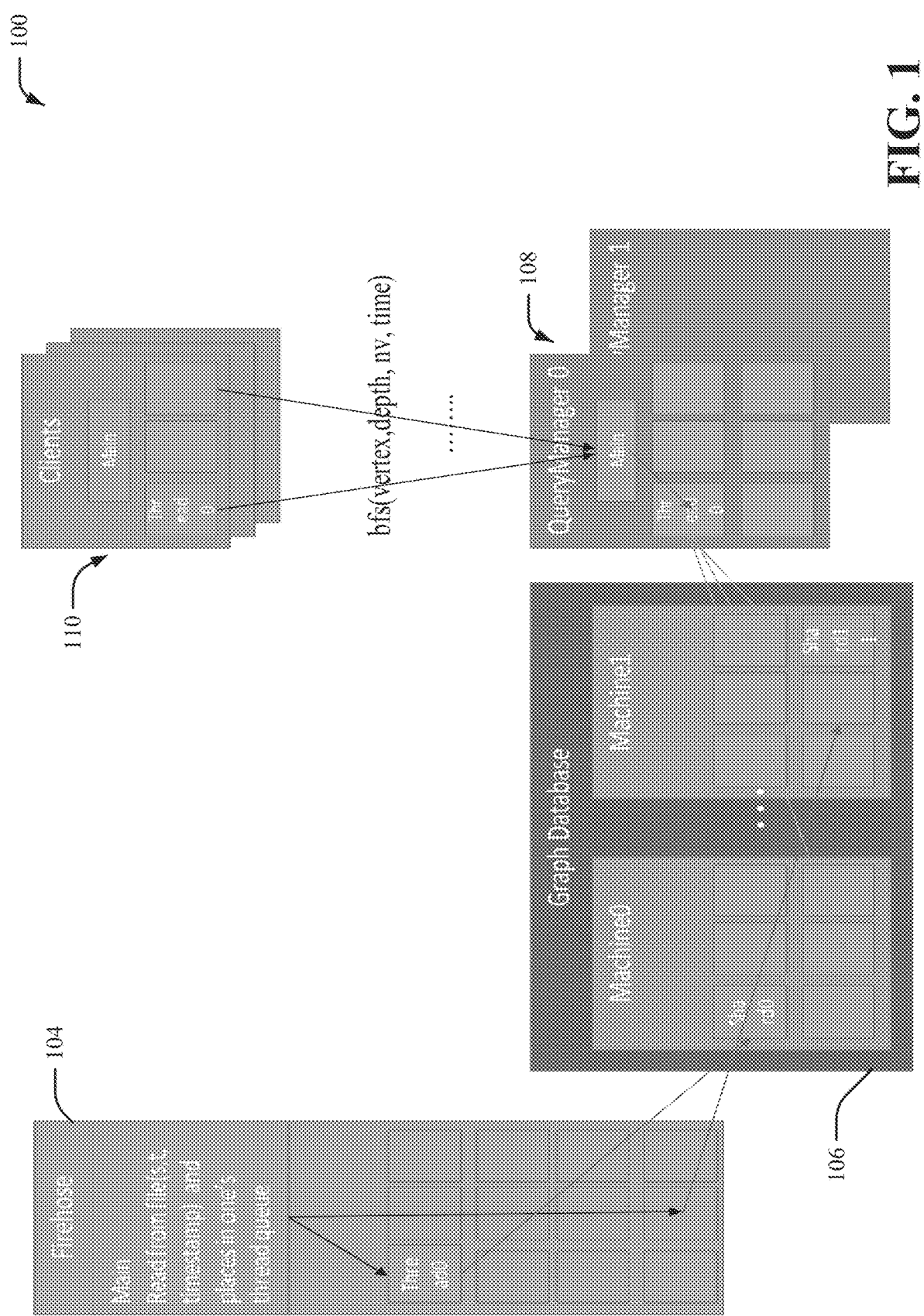
FIG. 1 illustrates a block diagram of an example, non-limiting architecture in accordance with one or more embodiments described herein.

Distributed graphs present unique challenges with respect to different disparate machines and maintaining sharing of unique edge identifiers (IDs). Sequential updating is the most simple manner for maintaining distributed graphs. Reduction of number of steps in connection with such sharing can improve data throughput and integrity. In this disclosure, FIG. 1 illustrates a novel architecture for a system 100 designed to ingest a large number of vertices and edges while simultaneously or concurrently allowing a high query throughput with low latency for each individual query. The system can include the following modules: a firehose 104; a graph database server (or alternatively graph database component) 106; a query manager 108; and client(s) 110. A graph database can maintain a graph dataset in the memory of a computing device, on a hard drive of a computing device or on both memory and hard drive in a hybrid solution. A distributed graph database can store a graph dataset on a collection of separate physical computing devices, such as multiple different computers, each with their own separate processor and memory.

As a prelude to the detailed discussion regarding the novel architecture and its aforementioned modules, a foundation for better understanding the architecture is provided through three broad categories: graph data structure libraries, graph processing frameworks, where the emphasis is on the programming models, and graph databases, where the focus is on storage.

Graph libraries: Graph libraries can provide in-memory-only processing. For example, BOOST Graph library (BGL) provides a generic graph library where users can customize multiple aspects of a data structure including directness, in memory storage, and vertex and edge properties. This flexibility facilitates users customizing the data structure for particular needs. Parallel BOOST graph library, Standard Adaptive Parallel Library (STAPL) and Galois, provide in memory parallel graph data structures. These projects provide generic algorithms to access all vertices and edges, possibly in parallel, without knowledge of underlying in-memory storage implementation. Our graph database employs a similar design philosophy with these libraries but extends these works with support for persistent storage and a flexible runtime for better work scheduling.

Graph processing frameworks: Pregel and Giraph employ a parallel programming model called Bulk Synchronous Parallel (BSP) where the computation consists of a sequence of iterations. In each iteration, the framework invokes a user-defined function for each vertex in parallel. This function usually reads messages sent to this vertex from a last iteration, sends messages to other vertices that will be processed at a next iteration, and modifies the state of this vertex and its outgoing edges. GraphLab is a parallel programming and computation framework targeted for sparse data and iterative graph algorithms Pregel, Giraph and GraphLab are good at processing sparse data with local dependencies using iterative algorithms. However they are not designed to answer ad hoc queries and process graphs with rich properties.

TinkerPop is an open-source graph ecosystem consisting of key interfaces and tools needed in the graph processing space including the property graph model (Blueprints), data flow (Pipes), graph traversal and manipulation (Gremlin), graph-object mapping (Frames), graph algorithms (Furnace) and graph server (Rexster). Interfaces can be defined by TinkerPop. As an example, Titan adheres to many APIs defined by TinkerPop and uses data stores such as HBase and Cassandra as the scale-out persistent layer. TinkerPop focuses on defining data exchange formats, protocols and APIs, rather than offering a software with good performance.

Graph stores: Neo4J provides a disk-based, pointer-chasing graph storage model that stores graph vertices and edges in a de-normalized, fixed-length structure and uses pointer-chasing instead of index-based method to visit them. By this means, Neo4J avoids index access and provides better graph traversal performance than disk-based relational database management system (RDBMS) implementations.

Distributed Graph

The distributed graph database is a composition of a fixed set of single node graph databases called shards. The distributed graph is in charge of managing a list of computation nodes and mapping of shards to nodes and implements an API such that users see only one database instance and not a collection of distributed services. Thus, upon instantiating a distributed graph, a naive user can have access to the same interface as that with the sequential vertices and edges handled internally by the distributed graph API.

The graph can distribute its vertices by default based on a hash function applied to the external vertex identifier. An edge can be located with its source vertex by default. Thus a typical distributed graph method can perform as its first step the computation to decide the shard where a particular vertex or edge is located or the shard where it will be allocated. Subsequently the method invocation can be forwarded to the shard in charge to finish the method execution.

Figure 2:
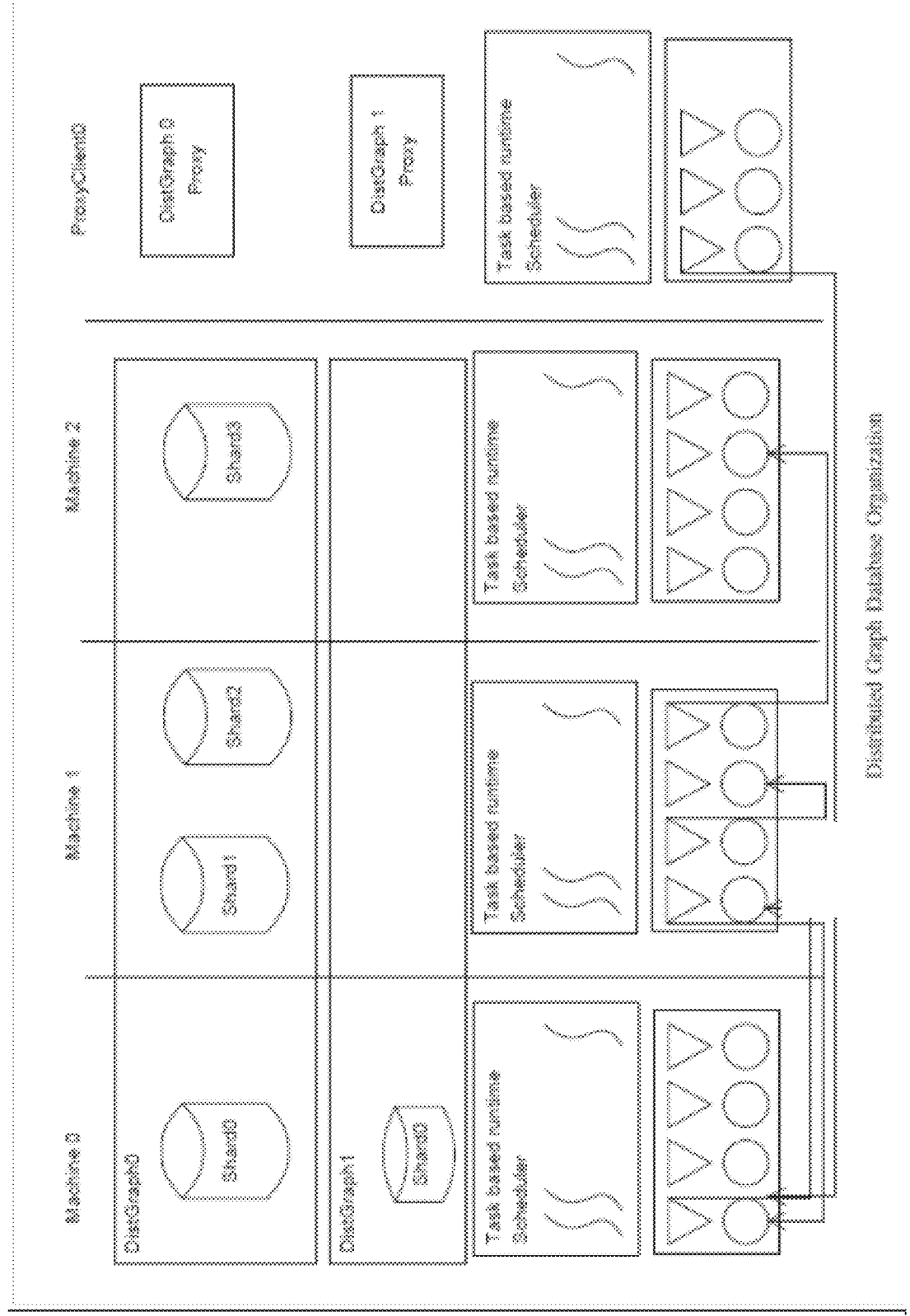
FIG. 2 illustrates a block diagram of an example, non-limiting distributed system that executes two distributed graph instances in accordance with one or more embodiments described herein.
Figure 7:
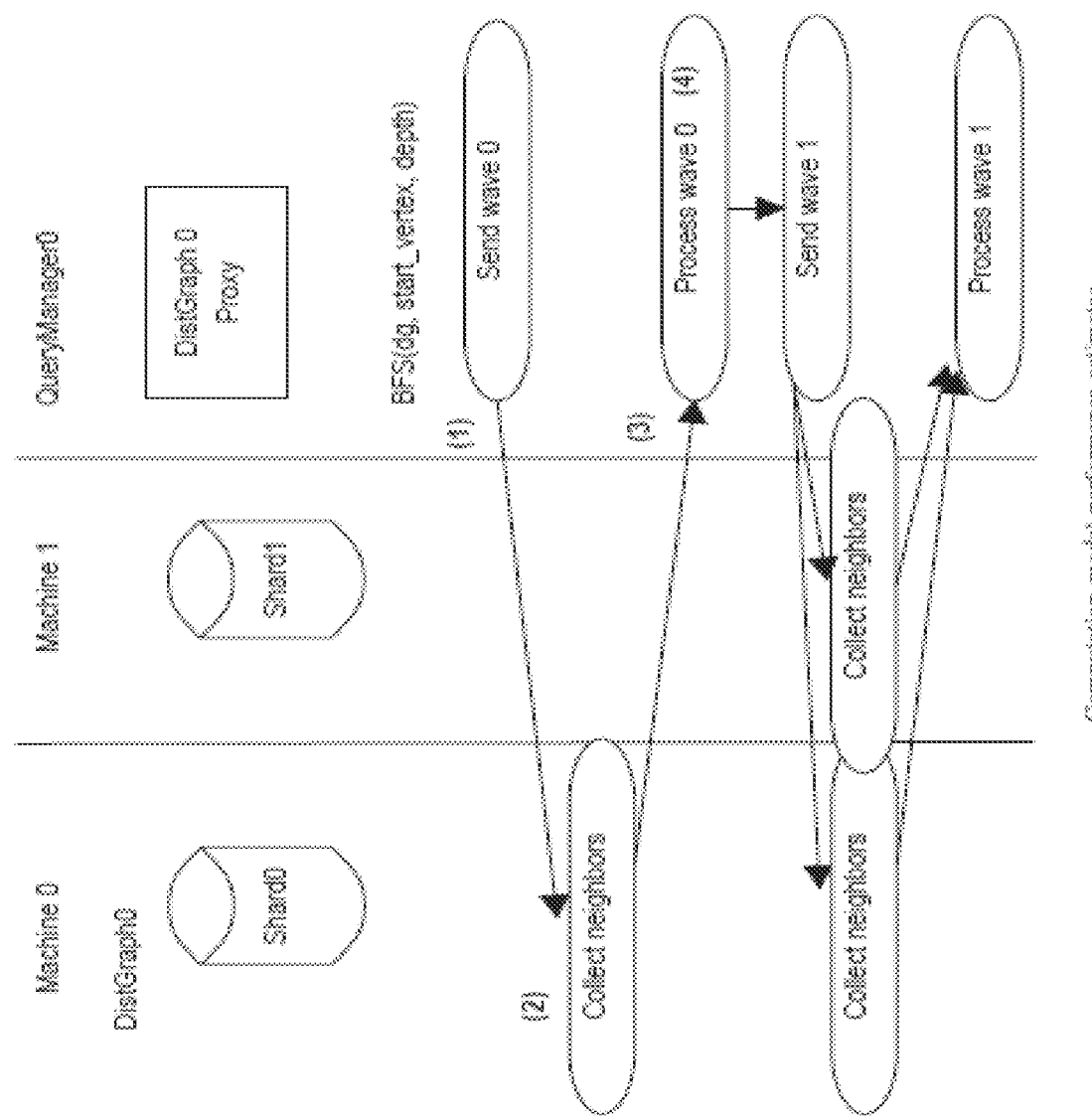
FIG. 7 illustrates a block diagram of an example, non-limiting system that facilitates example computational model performance estimates in accordance with one or more embodiments described herein.

In FIG. 2, a distributed system running two distributed graph instances is shown. In general, a machine can host an arbitrary number of shards with each shard running as a distinct process. One or more shards, or in some embodiments each shard, can be uniquely mapped to a host and port as specified by a host file created during the cluster configuration. The cluster depicted has three physical machines hosting the distributed graph system: Machine 0, 1, and 2. Within one machine, there are a number of shards that can belong to multiple graph databases. One or more shards, or in some embodiments all the shards, of a database can be managed by a distributed graph object responsible for address resolution and method forwarding. Data in a distributed graph database can be accessed by any of the nodes of the database. Additionally, in the model a QueryManager (QM) is introduced as a separate process running on its own machine with its own hardware resources. The QM can instantiate a same distributed graph object as all the other shards except a different flag can be passed to a constructor to signal that this instance is not a shard but a proxy. In proxy mode, a distributed graph object will not own any data and any method invocation is performed at a remote location. In the following section, main communication primitives that can be used to exchange data between nodes of the database are described.

Single Node Graph Database

The single node graph database implements a property graph model. Each graph is identified by a user-specified graph name and is comprised of vertices, edges, and properties (e.g., attributes) associated with each vertex and edge. Each vertex is identified by a unique external vertex ID specified by a user and an automatically generated unique internal vertex ID. Each edge is identified by vertex IDs of its source and target vertices and an automatically generated unique edge ID. Multiple edges between a same pair of vertices are allowed.

In some embodiments, one or more vertices or edges (or, in one embodiment, each vertex or edge) is associated with a string label that can be used to categorize vertices and/or edges and facilitate efficient traversal (e.g., only traverse edges of a specific label). The property set of a vertex and/or edge can be or include a list of key-value pairs where each key is a property name and the value associated with the key is the value of the corresponding property for this vertex and/or edge. Property values can be strings, numbers (integer, float, double), vector of numbers, or composite values consisted of strings and numbers. In some embodiments, multiple values for a single property, and properties (e.g., meta data) of properties can be those that are supported to be compliant with Apache TinkerPop 3.

Internally vertex-centric representations can be used to store vertices and edges, along with the maps for vertex and edge properties. An underlying high-performance key-value store can be used to store the above representations in memory and/or on disk.

A rich set of graph APIs can be provided to support most, if not all, fundamental graph operations, including graph creation and/or deletion, data ingestion (e.g., add vertex can be edge one at a time or via batch loading of files in comma-separated value (csv) format), graph update (e.g., delete vertex and/or edge, set and/or update or delete vertex and/or edge properties), graph traversal (iterate through vertices and edges of each vertex), data retrieval (e.g., get vertex and/or edge properties), graph search (e.g., find vertex and/or edge by ID, build or search property index).

Messaging Layer

Applications written within the subject framework can be executed in a Single Program Multiple Data (SPMD) fashion similar to Message Passing Interface (MPI). The binary corresponding to an application can be executed on multiple machines and each instance can have its own identity and know how many nodes make up the computation. After an application starts it can access local memory and local storage. When remote data needs to be processed, communication can be employed. In some embodiments, the distributed graph system can use Remote Procedure Call (RPC) as its core communication abstraction. The RPC can be abstracted on top of a native communication library such as sockets, Message Passing Interface (MPI), Parallel Active Message Interface (PAMI) or Global-Address Space Networking (GASnet) inheriting advantages and disadvantages of the underlying layers. The RPC abstractions provides to the distributed system developers a high level abstraction that helps with productivity and portability of the system.

The RPC API exposed to the user can be exemplified in FIG. 3. At the very high level, RPC can allow users to invoke a function with optional arguments on a remote machine. In embodiments described herein, RPC can employ a user specification of the destination machine, the function to be invoked on the remote host and the arguments to be passed to the function. Such specification can be as shown in FIG. 4, line 33. The arguments that will be passed from source machine to the target machine can be encapsulated into a single structure together with a special method that is used to serialize and de-serialize custom data members to a stream of bytes. In one embodiment, the Cereal library is used for this purpose and the user can enumerate all data members of the structure as shown in FIG. 4, lines 11-17. The library can serialize by default all basic data types and most of the standard template library (STL) containers including vectors and strings. The library call also recursively serializes data members that are struct or class, provided the data members have their own serialization method already defined.

The function pointer corresponding to the function to be executed remotely can be converted to a unique integer number before being sent on the network. On the receiver side the unique integer can be converted back to a function pointer local to the destination machine. In general one can not assume that a function pointer has the same value on the different nodes where the RPC will be executed. The mapping from a global to unique integer and the inverse operation can be achieved using the register_rpc utility as shown in FIG. 4, line 29. In turn, this call can store into a first table the mapping from function pointer to a unique identifier and in a second table the inverse mapping from a unique identifier to the function pointer. The registration of the RPC functions can be performed as one of the first steps of a program using the infrastructure we present here.

The RPC functions can be registered by all processes of a computation before being invoked. In some embodiments, this can be accomplished using a barrier like concept. The computation to be invoked remotely can be implemented in the subject framework with two functions. A first function that can be invoked remotely will receive as arguments an identity of a sender, a byte buffer corresponding to serialized arguments, and/or size of the buffer. This function can de-serialize the byte buffer into the argument that the user passed when invoking the RPC and subsequently invoke the user function with the argument passed in by the sender. The reason for this double invocation is the fact that, in this embodiment, the subject RPC is a pure library approach and the re is not a separate tool to hide some of the implementation details from the user. For example, FIG. 4, lines 22-26 shows the function in charge of receiving the byte array including the de-serialization step and the invocation of the user requested function. The user specific computation can be performed as part of lines 20-21. In the embodiment shown, a simple RPC invocation call chain is over once the framework invokes the remote user function. In some embodiments, a return value may be required. In this case the invoking process can pass in the list of arguments the local memory address of a variable and the identity (FIG. 4, lines 4-7). This can be used by a second RPC invoked by the destination node to write back the result value. The process waiting for a return value can often need to spin while waiting for the results to come back and while spinning it can often perform a polling call to execute other possible incoming RPC. Both the arguments and the return values can be arbitrarily large data structures in some embodiments.

Runtime

In general, each individual process (or, in some embodiments, one or more processes) can receive RPC requests from multiple sources. In order to provide a high throughput of executed RPCs per second, a multithreaded task based runtime was employed. Within the system, each RPC invocation (or, in some embodiments, one or more RPC invocations) when received (or, in some embodiments, after receipt) from the network is encapsulated within a task and placed into a runtime scheduler for execution. The runtime scheduler can maintain a pool of threads and dispatch individual tasks to individual threads. The scheduler can also allow for work stealing to keep the load balanced. The same runtime can be also used within the framework to execute parallel computations within one SMP node.

Runtime Scheduler and RPC Interaction:

After an RPC request is received on one of the incoming communication channels, in some embodiments, the messaging layer will only extract the argument and prepare a task that will be placed for execution similar to the example shown in FIG. 3, lines 1-10 and 16-17. As such, the polling thread can extract RPC requests and post them for execution very fast. In some embodiments, the number of concurrent RPC requests that will be executed concurrently will be proportional with the number of threads used by the scheduler. Individual RPC requests can invoke additional RPCs as part of their body, as shown in the example in FIG. 4 when a return value was requested. Accordingly, it is possible in general that multiple tasks executing simultaneously or concurrently can post RPC requests concurrently thus calling for some amount of serialization when accessing the communication channels (sockets). Because individual channels can be maintained between pairs of processes, only synchronization of access to these channels for requests that have the same compute process destination is called for.

Query Manager

The foregoing introduced a distributed graph database design. The data has been shown as being distributed in shards across different computation nodes, with possible multiple shards per physical machine. The disclosed embodiments also provide for detail regarding how a graph database can be accessed by clients. Referring back to FIG. 1 within the subject system 100, database clients are distinguished into two categories. A first category called query manager(s) 108 and a second category called regular client(s) 110. The query manager(s) 108 can be a database client that will run on a powerful node in terms of memory and computing resources like cores and hardware threads. The query manager(s) 108 can open a communication channel with each individual process (or, in some embodiments, one or more processes) of the distributed database and afterwards is capable of posting RPCs to any of the nodes of the database for performing various graph operations. Regular client(s) 110 will not connect to the distributed database directly but rather they will connect to a query manager 108 and this will execute the query for the client 110. The extra level of indirection has the following advantages. First it allows for a level of control for database load. The query manager 108 may decide to delay the clients answers rather than loading a database with requests that can't be handled. Secondly it is often the case that a query on a graph database is a complex computation like a breadth first search (BFS) or finding a path between a source and a target. For these queries the query manager 108 may end up accessing all shards of the database multiple times. Thus the query manager 108 can maintain all this partial state while performing the query and it returns to the client 110 when the final answer is available. It is also possible that the query manager 108 can perform additional number of optimizations like some information caching to further optimize response times for advanced read queries.

Query Manager Implementation:

The query manager 108 when creating an access point to a graph database will instantiate the same distributed graph class as all the other processes of the database. The only difference will be a flag passed to the constructor that will inform the address resolution module that none of the graph data is local and everything needs to be accessed using RPC. As shown in FIG. 5 the graph instantiated by the query manager 108 acts as a proxy to the database data.

Graph Queries and Analytics

Continuing to refer to FIG. 5, the query manager 108 will handle most if not all basic queries like add/delete/get vertex, edge, property. Additionally the query manager 108 can implement graph specific queries like various traversals. In this section, what is disclosed is how queries for the distributed graph can be implemented. As a simple example, consider a simplified breadth first search where we go only a given number of levels deep. The analytic will be provided with the distributed graph instance, the starting vertex and the number of levels. First, a partitioned frontier is instantiated which will maintain a list of vertex identifiers grouped by the shard to which they belong. We start by adding the initial starting vertex to it (lines 2-3). Next, an iterative process is started where the next BFS frontier is computed based on a current frontier. For this, the system 100 extracts from the frontier vertices that all live in a certain shard and we post an asynchronous request to that shard to collect and retrieve all neighbors of this set of source vertices (lines 7-10). This is performed using the graph method get_all_edges_async( ) which internally will use the RPC mechanism previously described. It should be noted that none of the results are available as soon as method is invoked. The system 100 only started the computation on remote shards when the method returns this. After the requests to all relevant shards are posted next the system 100 starts waiting for result(s) to arrive back. It is possible that by the time the system 100 finishes the last invocation some of the results may be already back, thus this flexible RPC mechanisms allows the system 100 to overlap communication with data retrieval.

In a second phase, the system 100 waits for data from a particular shard to arrive and next it processes received data preparing the next wave of the BFS. Additional analytics can be implemented in a similar execution model with the algorithm described in this section. It is contemplated to exploit distributed asynchronous algorithm(s) to perform various analytics. The RPC mechanism the system 100 employs can allow, for example, for a traversal to start from a query manager node, but next the traversal can be forwarded by the individual shards of the database which asynchronously may send result data back to the query manager 108.

Clients

Regular clients 110 will connect to a query manager 108. There can be more than one query manager 108 per system but still a small number in the order of tens. Regular clients 110 can be in the order of hundreds and they will communicate with a query manager 108 over a network protocol. Currently a query manager 108 can start an HTTP server and accept REST queries from clients 110 that are subsequently mapped into graph operations.

A client 110 can request multiple graph traversals to be performed for particular vertex ids. Traversals can happened concurrently from possible multiple threads. Requests are posted to the query manager 108 which will perform the data aggregation for the whole traversal. The rest API can be issued from a browser, JavaScript, Java or Python program.

Firehose

Another novel concept for a distributed database that is introduced in the subject novel framework is the Firehose 104, an extension for optimizing the ingestion of data. The single node graph database that is extended to provide the distributed version is optimized for a single writer, multiple readers scenario. The single node database supports multiple concurrent readers alongside a writer. However if multiple threads are trying to access the database for write operations they will be simply serialized. For this reason in the subject design each process running a shard of the database creates an additional thread that is in charge of only write operations. The main thread reads from file/socket a line (source, target, timestamp, . . . ). A decision is made regarding the destination shard (ShID) based on source vertex. The firehose 104 can use different placement functions (e.g., Hashing, Explicit placement and an additional key value store for placement tracking). The firehose 104 places the data in the queue of the thread in charge of shard ShID. Each thread is in charge of one shard. It reads from local queue and pushes on a socket connection of the data. Data pushes are buffered and no explicit return values are expected for maximum throughput.

In a lot of large scale practical applications there is often a continuous stream of vertices and edges being created and lots of read queries executed simultaneously with the stream of inserts. For these applications, the Firehose 104 will be in charge to add the edges, possibly in a batched mode, while query manager as introduced in this section will be mainly in charge of read only queries. The Firehose 104 will run as a separate process, opening communication channels to all the shards of the database. At the same time the Firehose 104 will connect into the client existing infrastructure accepting requests for adding vertices, edges or updating properties for existing vertices and edges.

With respect to the graph database server (or alternatively graph database component) 106, a highly scalable solution is provided using multiple shards per node (OS instance, machine) and multiple nodes (cluster). Each shard server will have a connection to all other shards for fast data exchange. These will be used for asynchronous queries and load balancing long adjacency lists. Each shard will provide a connector for the firehose 104 for fast data insertion. The firehose 104 can connect/disconnect at its own pace. Each vertex and edge has an unique identifier that has shard id embedded in it. Assuming one machine has access to internal vertex identifier it has access to the shard/machine where the vertex is located. The system 100 provides a runtime that supports a highly concurrent execution of requests. One thread inserts/updates (ReadWrite Transactions). Multiple threads perform read operations/transactions.

Vertex and Edge Management

In the subject distributed graph database each vertex and edge is uniquely identified by an internal vertex and edge identifier respectively. In this section we discuss how identifiers are generated and managed while adding items to the database. Edges (outgoing and incoming) are stored as tuples of such identifiers to save storage and improve the data lookup performance.

Additionally vertex and edge properties are stored as key, value pairs using the vertex or edge ids as keys. Internal Vertex identifiers Each vertex has a unique numeric internal identifier. This is allocated when the vertex is created and it won't be reused for any other vertex in the database. In a single node graph database producing a unique id is done by incrementing a variable each time a vertex is added. We will refer to this variable as MAX VID and an unsigned 64 bit number can be used to represent it. When the database is first created this is initialized to zero. To reduce storage requirements a numeric label identifier can be embedded within the binary representation of the vertex identifier, for example in the most significant bits. The vertex identifier is returned to the caller when the vertex is created or by the find_vertex method with an external identifier. For a distributed graph database the system 100 ensures a unique vertex identifier by using the following protocol. First a vertex is uniquely associated with a shard by using either a default hash function or an arbitrary placement function provided by the user. The distributed graph maintains a mapping from the shard identifier to the physical machine where the shard is stored. The vertex will be added to the shard and the machine as previously identified. When adding a vertex to a shard a vertex identifier is generated by incrementing the shard-local MAX VID variable and the overall global identifier of the vertex becomes the following triplet {LabelId, ShardId,LocalVertexIdentifier}. Edge Identifiers: Each edge has associated an unique edge identifier. A major challenge for our design comes from the fact that we allow multiple edges between the same two vertices and because we store both incoming and outgoing edges. Assuming we have two vertices A and B and we add an edge {A,B} followed by another edge from {A,B}. Using an unique edge identifier allows to distinguish between the two edges: {A,B,eid1} and {A,B,eid2}. For undirected graphs or graphs where we track incoming edges we store two edge tuples in the database. For example, for the edge {A,B} we store one outgoing edge {A,B,eid1} and one incoming edge {B,A,eid1}. Both edges will know they are part of the same edge because they share the same unique identifier. For a single node graph database an edge identifier can be easily generated by incrementing a MAX EID, unsigned 64 bit integer. For the distributed database the number of actions to be performed when adding an edge increases due to the fact that the source and the target may live in two different shards on two different machines. Assuming a vertex A is mapped to shard1 and a vertex B is mapped to shard 2, at a minimum, for the edge {A,B} we store one outgoing edge {A,B,eid1} on shard1 and one incoming edge {B,A,eid1} on shard2. The edge identifier will be generated in shard1 and communicated to shard2 together with the rest of the arguments when adding the incoming edge. It is also valid to generate the id in shard2 and communicated to shard1 provided the shard identifier is also embedded in the most significant bits of the edge identifier.

Efficient Edge Addition for a Distributed Database

A very common operation for graph databases is adding an edge between a source and a target vertex without adding vertices a priori. For example add_edge(A, Knows, B). This turns out to be a complex operation as shown in FIG. 6. First the operation will add two vertices A, and B if they don't exist already (FIG. 6, lines 2,3), create a label Knows if it doesn't exist already (FIG. 6, line 4), add the outgoing edge for A (FIG. 6, line 5) and add the incoming edge to B (FIG. 6, line 6). Note that each of these invocations produce vertex and edge ids that are subsequently used creating data dependencies between the five steps of the method.

Basic algorithm: A straightforward approach to implement the steps depicted in FIG. 6 is to execute the code above on a client or query manager node and execute all 5 steps synchronously one after another. Thus for each of the steps 2 to 6 we will have two messages exchanged over the network: one to invoke remotely the operation and one to return results used in the subsequent steps. Thus there will be a total of at least seven messages exchanged (the last step doesn't have to return anything). If confirmation of the final step is required then this approach will take a total of eight steps. 2) Asynchronous algorithm: A first improvement we propose in this patent is to use asynchronous RPC mechanism that our runtime natively supports. For this approach we first forward the add edge method to the node where the destination is allocated (DEST SHARD). On this shard the destination vertex is found or created and its id(VIDT) is forwarded with the rest of the arguments to the machine where the source is located (SOURCE SHARD). Here the source vertex will be located or created(VIDS), the outgoing edge will be created {VIDS,VIDT,LID,EID} and finally forward the invocation back to DEST SHARD to add the incoming edge using the edge id previously generated.

Thus, the number of communication steps are reduced from seven down to three. A fourth step can be optionally employed if a confirmation of the method termination is required on the client initiating the operation.

Batched edge and vertex addition: It is often the case that edges and vertices are added to the database at very high rates and it is acceptable by the user's application that the vertices or edges are added in a batched fashion. In this section we describe a novel mechanism for adding items using batches. We previously introduced the notion of Firehose for optimizing fast insert rate operations and the batching mechanism presented in this section is implemented as part of the Firehose. Let's assume a set of edges are to be added to the database using the semantic described in FIG. 6. The Firehose will collect a batch of them of size N and perform the following processing on them: 1) Create 2*P queues where P is the number of shards. For each shard there will be one outgoing and one incoming edges queue. 2) For each add edge request place one entry in the outgoing edges queue corresponding to the shard where the source vertex of the edge is allocated. Similarly we place an entry in the incoming edges queue corresponding to the shard where the target vertex is allocated. 3) For each pair of queues for each shard we collect the set of vertices to be added to the shard and we send one bulk request to the shard to add the vertices. This step can be done in parallel for all pairs of queues and their corresponding shard. The request will return the vertex identifiers for all newly added vertices. It will also reserve an edge id range on the shard and the edge id range is also returned to the Firehose. 4) Based on all vertex identifiers returned and edge ranges reserved the Firehose will prepare the final tuples corresponding to the edges to be added. The edge tuples containing only internal ids will be sent to the database shards to be inserted. This insertion also happens in parallel for all shards. 5) Optionally, the mapping from external vertex id to internal vertex id can be cached on the Firehose such that to minimize the number of vertices information sent to the shards in step 3.

This novel approach for performing batched edge addition provides the highest amount of parallelism and the lowest number of messages exchanged compared to the other two methods previously introduced. For a given batch of N method invocations, the basic algorithm will perform 7*N communication messages, synchronizing for each step. The asynchronous algorithm performs 3*N messages if the invoking thread doesn't require confirmation termination or 4*N messages if confirmation is required. The batched approached will exchange four larger granularity messages per shard for the whole set of N invocations for a total of P*4 messages. Usually P will be much smaller than N. While the batched method send much fewer messages, there is more data per message sent. However most networks perform better when data is aggregated in bigger chunks.

Figure 8:
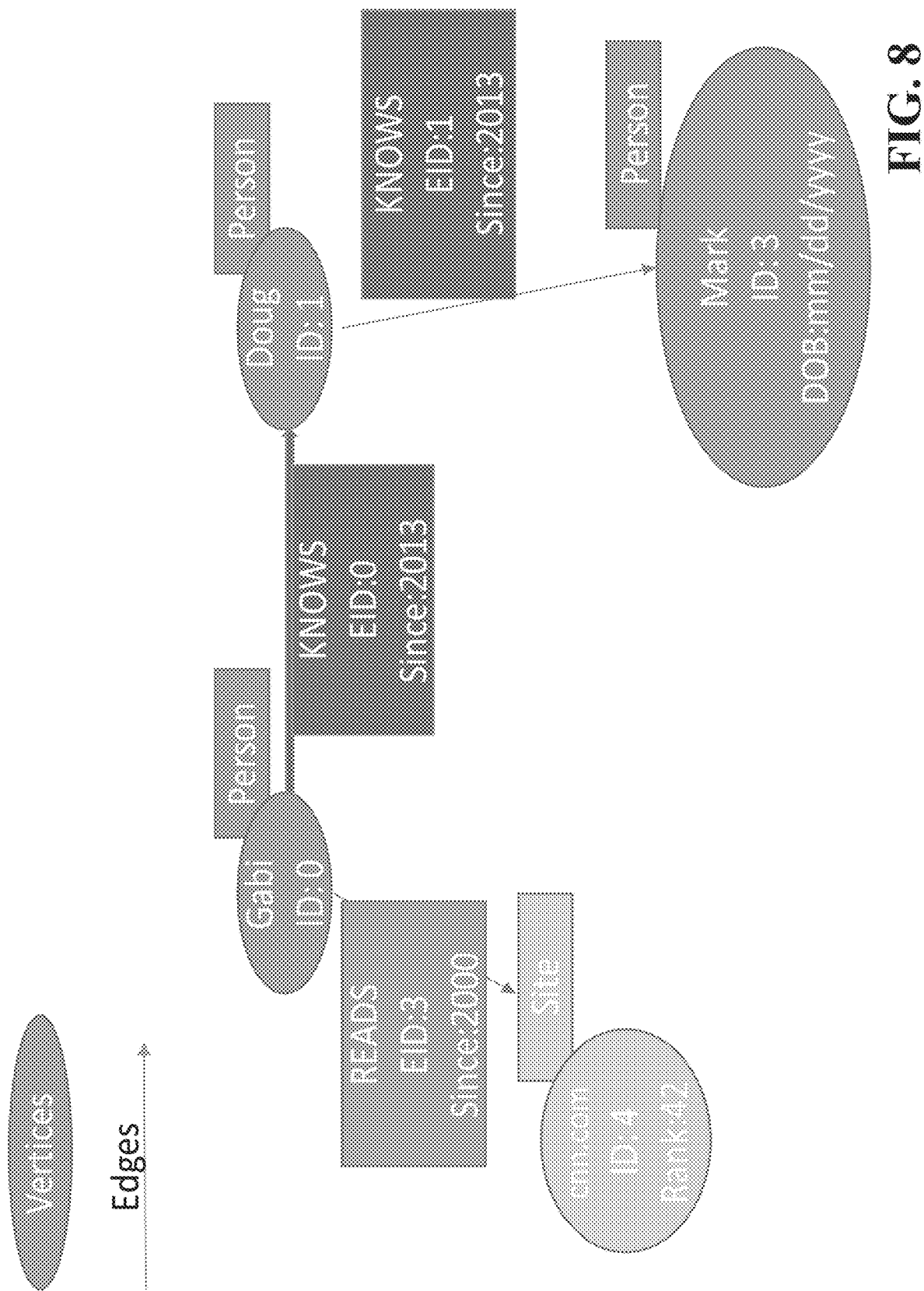
FIG. 8 illustrates an example, non-limiting property graph model in accordance with one or more embodiments described herein.

FIG. 8 illustrates an example property graph model in connection with the subject novel architecture. Collection of vertices, edges and their associate properties; Vertex: External Id: Unique Identity, URL, UUID, etc: String Internal Unique Numeric Id: UINT64; and Edge: Label: String, Internal Unique Numeric ID: UINT64.

Figure 9:
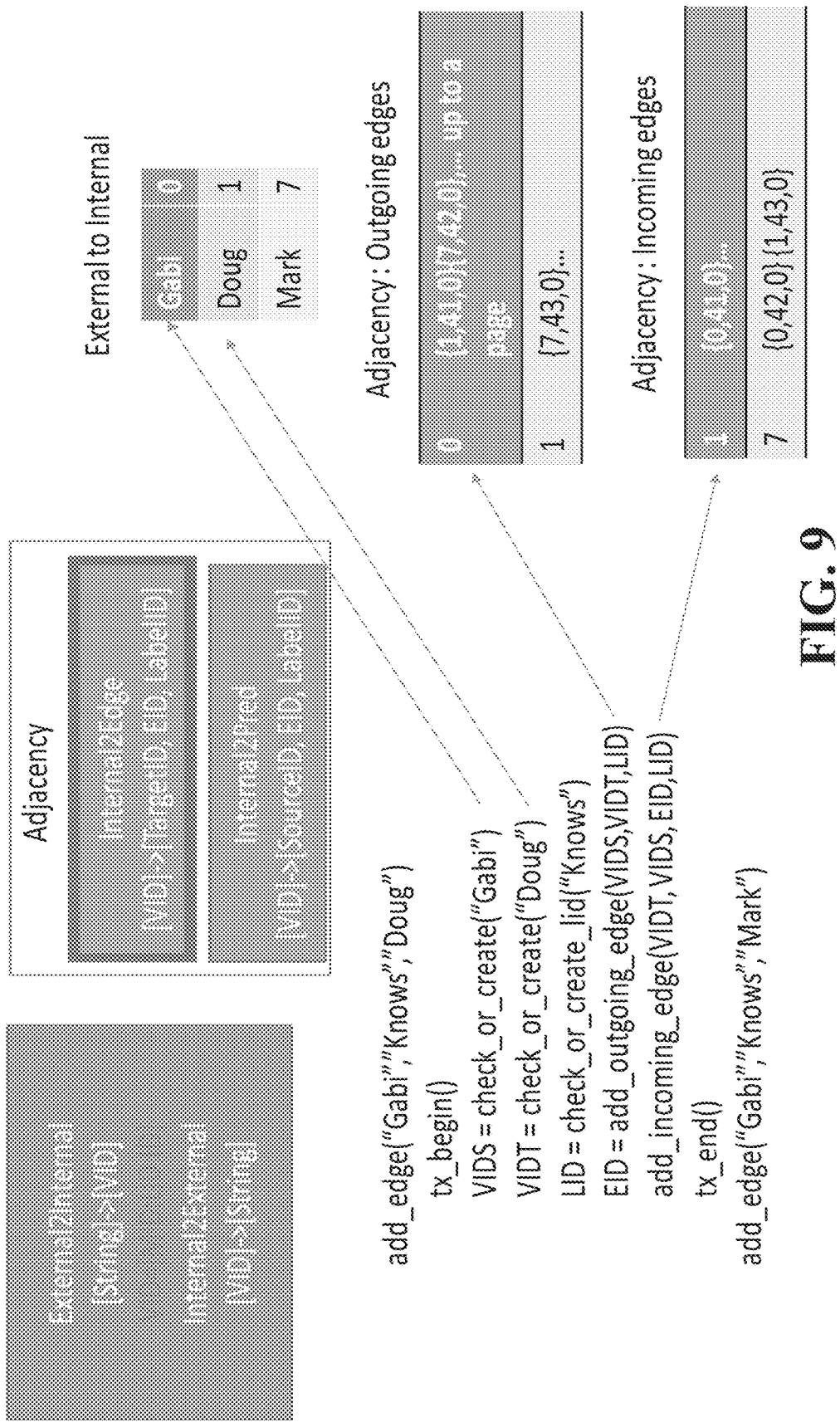
FIG. 9 illustrates an example, non-limiting dynamic storage schema in accordance with one or more embodiments described herein.

FIG. 9 illustrates a dynamic storage schema in connection with the disclosed architecture. Add edge in a single node database. For each edge we add one entry in the out going list of the source and one entry in the incoming list of the target. The database maintains a variable: MAXEID for the last edge identifier generated; initially this is initialized with zero. Every time a new edge is added:

We add new mapping <VIDS, {VIDT, MAXEID, LABELID}>

We add a new mapping <VIDT, {VIDS, MAXEID, LABELID}>

We increment MAXEID by one

It is mandatory that the entry for outgoing list of VIDS, and the entry for the incoming list of VIDT share the same value for MAXEID FIG. 10 illustrates a distributed graph example. Vertices are distributed on multiple machines. Outgoing edges of a vertex are stored where the source vertex is allocated. Incoming edges of a vertex are stored on the machine where the target vertex is allocated. There are three methodologies: (1) Method to reduce the number of exchanged messages for edge addition using asynchronous communication; (2): Method to reduce the number of exchanged messages for edge addition using firehose and batching; and (3) Method for low latency high throughput graph query execution.

With respect to vertex placement, a vertex is allocated to a machine using some form of hashing or an arbitrary placement function. The vertex is added to the designated machine and the machine will generate an unique vertex identifier according to the single node algorithm.

For a simple add edge in a distributed database, the basic algorithm is as shown in FIG. 11.

FIGS. 12-20 illustrate various methodologies in accordance with the disclosed novel subject matter. For simplicity of explanation, the computer-implemented methodologies are depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts can be required to implement the computer-implemented methodologies in accordance with the disclosed subject matter. In addition, those skilled in the art will understand and appreciate that the computer-implemented methodologies could alternatively be represented as a series of interrelated states via a state diagram or events. Additionally, it should be further appreciated that the computer-implemented methodologies disclosed hereinafter and throughout this specification are capable of being stored on an article of manufacture to facilitate transporting and transferring such computer-implemented methodologies to computers. The term article of manufacture, as used herein, is intended to encompass a computer program accessible from any computer-readable device or storage media.

Figure 13:
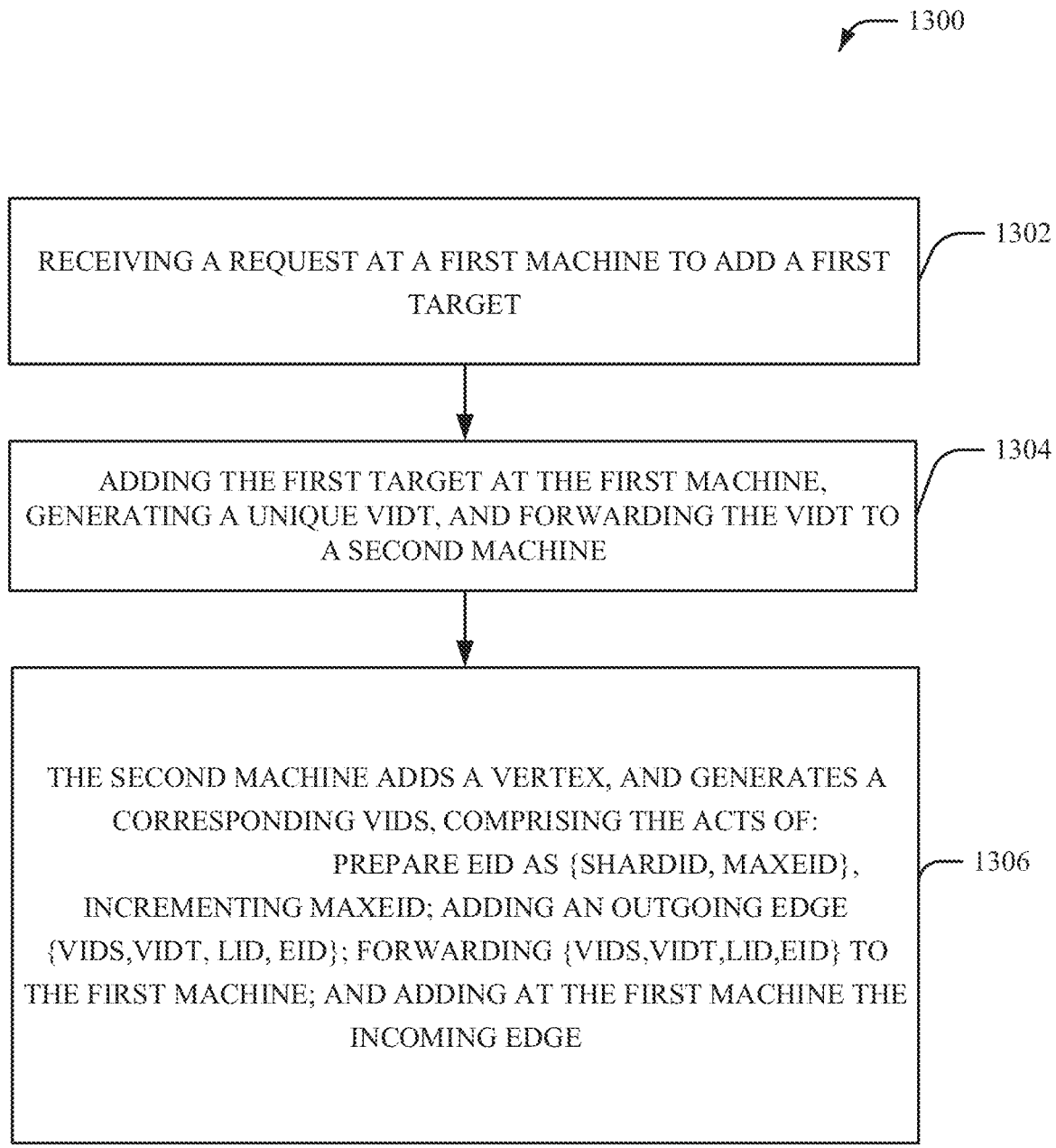
Figure 14:
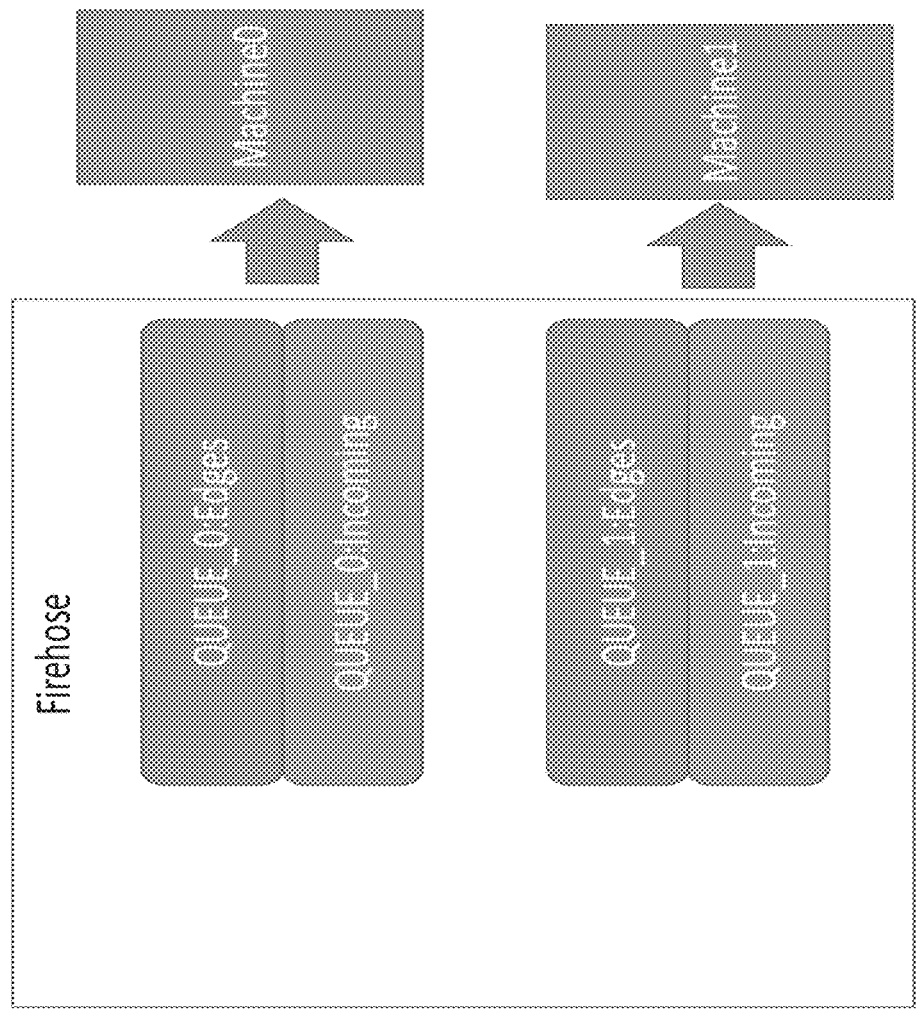
Figure 15:
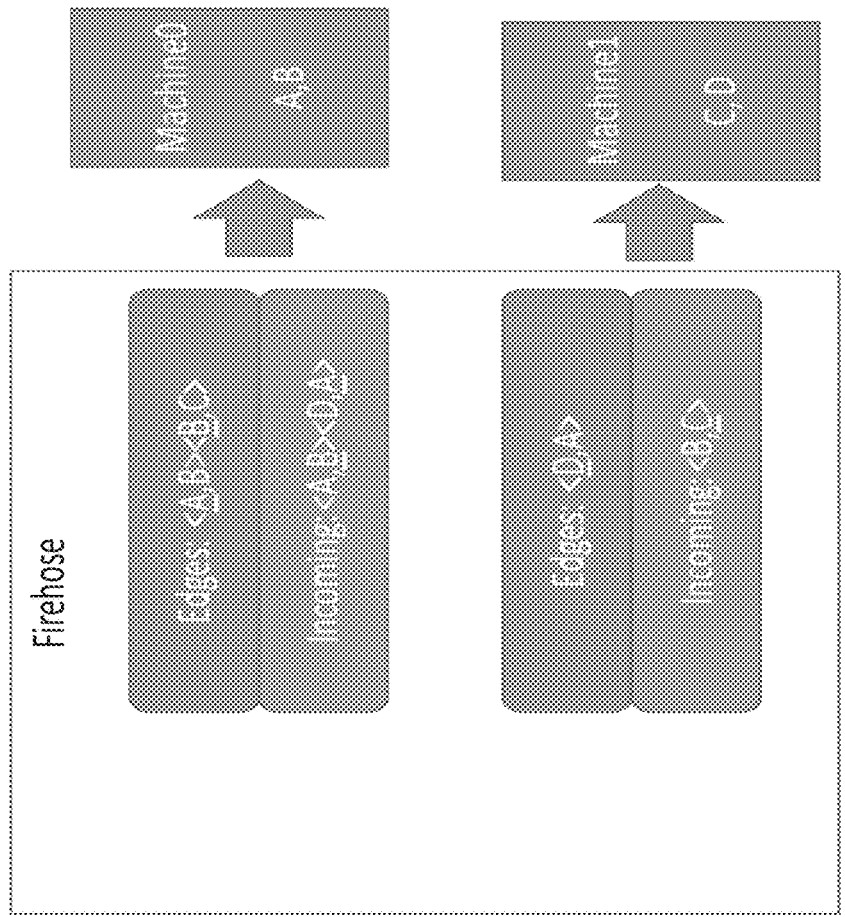
Figure 16:
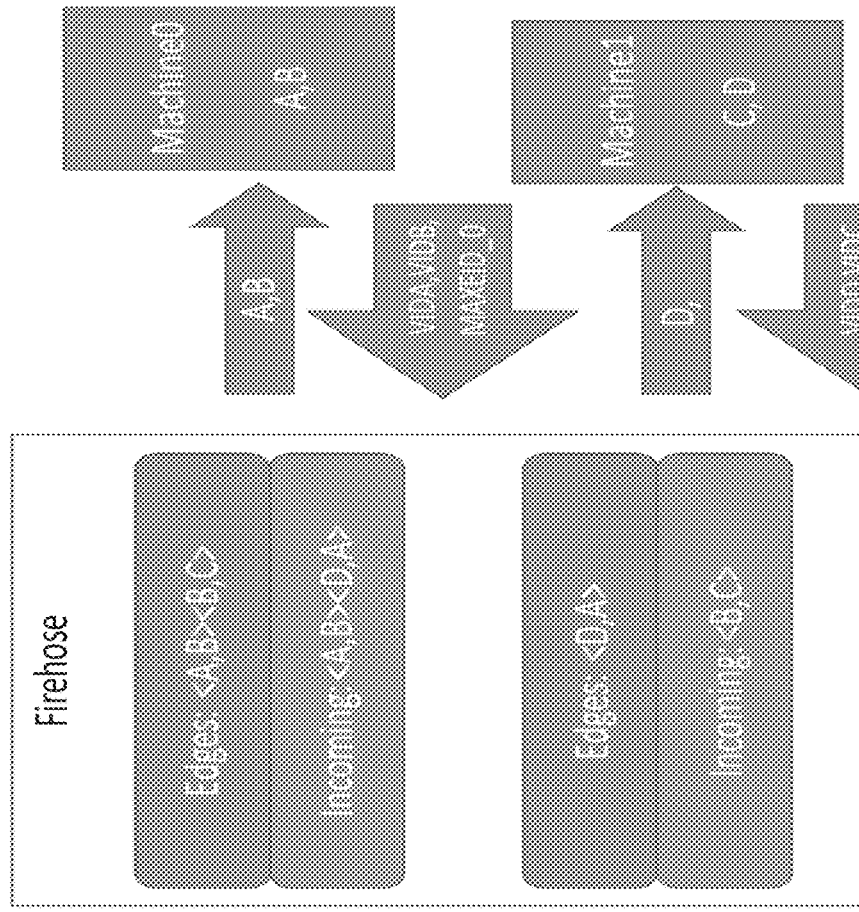
Figure 18:
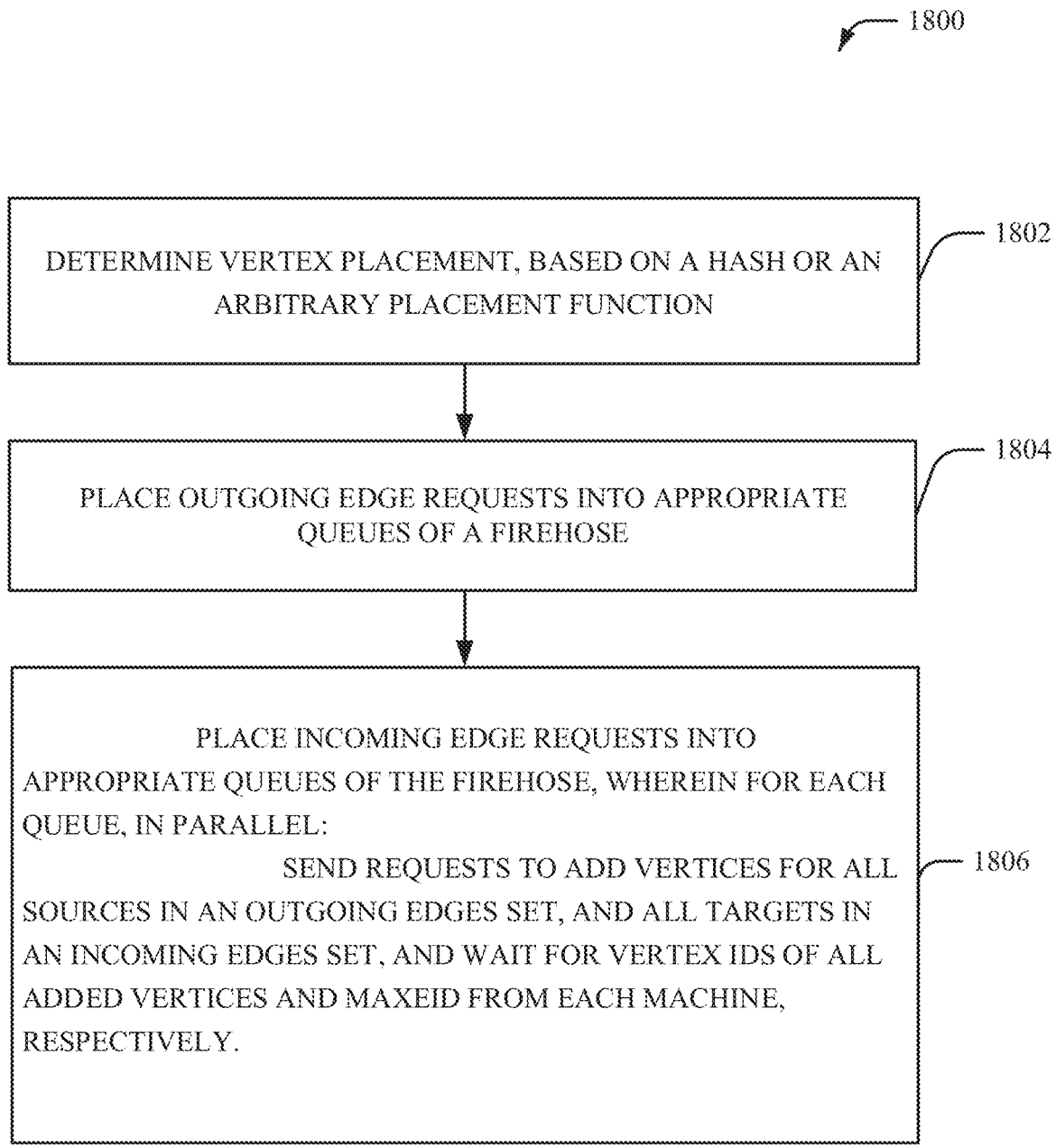

FIGS. 12 and 13 illustrate methods to reduce the number of messages required to add a new edge by using asynchronous communication. At 1302, a request is received at a first machine to add a first target. At 1304, the methodology performs the act of adding the first target at the first machine, generating a unique VIDT, and forwarding the VIDT to a second machine wherein the second machine adds a vertex, and generates a corresponding VIDS, comprising the acts of: Prepare EID as {ShardID, MAXEID}; incrementing MAXEID; adding an outgoing edge {VIDS,VIDT, LID, EID}; forwarding {VIDS,VIDT,LID,EID} to the first machine. At 1306, the methodology adds at the first machine the incoming edge.

In accordance with an optional embodiment, a maximum of three communication steps are performed per add edge request. In yet another embodiment, a maximum of four communication steps are performed per add edge request, wherein a fourth step is employed to confirm termination to a client initiating an operation.

FIGS. 14-18 illustrate a second methodology in accordance with the claimed subject matter for a high throughput edge addition with batched solution using the firehose. At 1802, the method determines vertex placement, based on a hash or an arbitrary placement function. At 1804, place outgoing edge requests into appropriate queues of a firehose. At 1806, place incoming edge requests into appropriate queues of the firehose, wherein for each queue, in parallel: send requests to add vertices for all sources in an outgoing edges set, and all targets in an incoming edges set, and wait for vertex ids of all added vertices and MAXEID from each machine, respectively. In accordance with an embodiment, an ingest process is divided into batches, and wherein the acts are executed for respective batches. In accordance with another embodiment, for all vertices added insert into a map (hash table) the pairing from external vertex identifier to internal vertex identifier <A,VIDA>, <B,VIDB>, <C,VIDC> and <D,VIDD>. In yet another embodiment, for all outgoing and incoming edges map from external ids to internal ids and edge identifiers. Upon receiving the ids for all vertices added the firehose will build for each queue, for all the tuples in each queue the following info: {VIDS, VIDT, LID, EID}. The method further comprises sending edge quads to respective machines for insertion. Furthermore, the mapping from external to internal can be cached for use in a next iteration.

Figure 20:
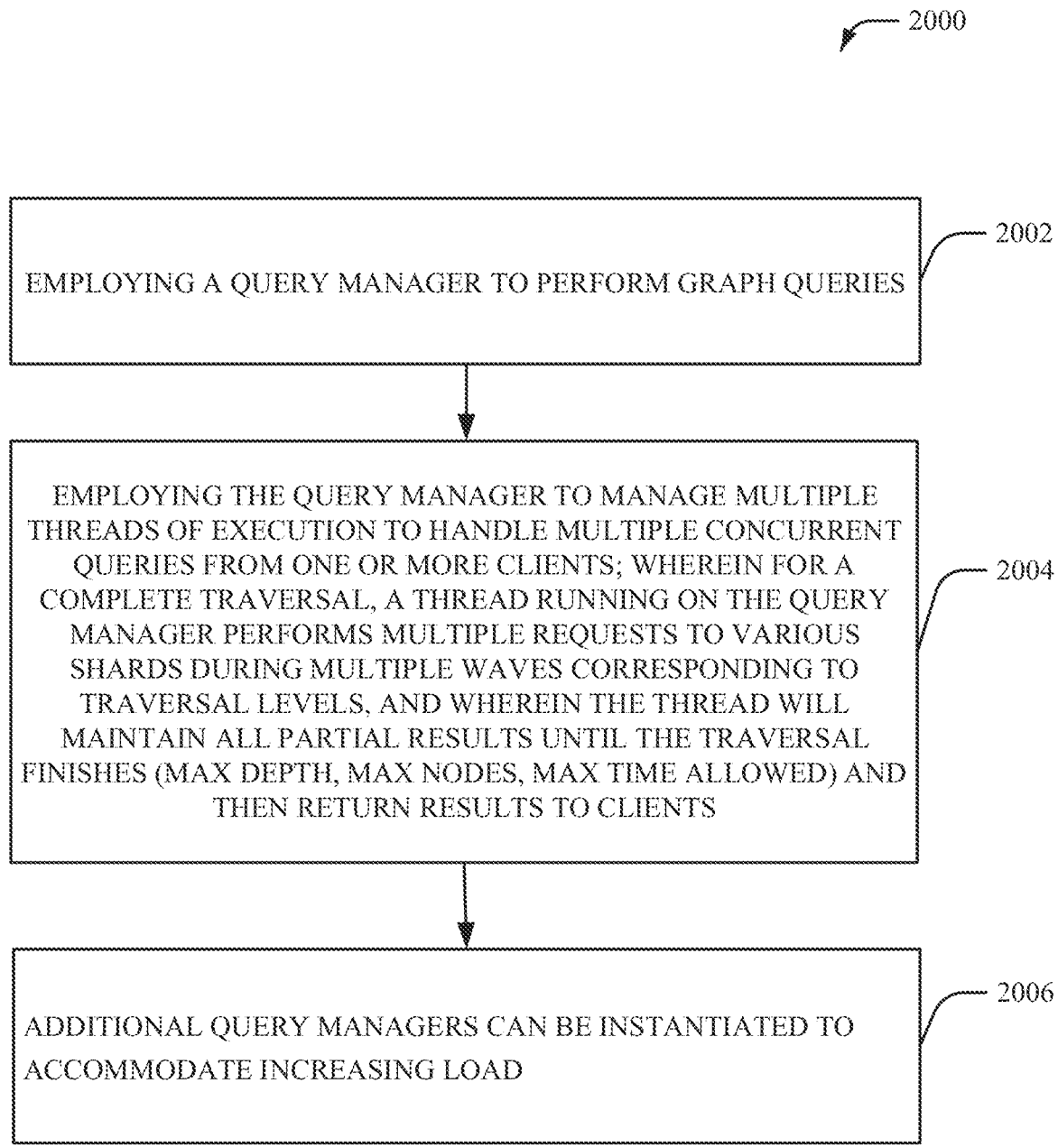

FIGS. 19-20 illustrate example methodologies in connection with the query manager. At 2002, a query manager is employed to perform graph queries. At 2004, the method employs the query manager to manage multiple threads of execution to handle multiple concurrent queries from one or more clients; wherein for a complete traversal, a thread running on the query manager performs multiple requests to various shards during multiple waves corresponding to traversal levels, and wherein the thread will maintain all partial results until the traversal finishes (max depth, max nodes, max time allowed) and then return results to clients. In an embodiment, additional query managers can be instantiated to accommodate increasing load.

Figure 21:
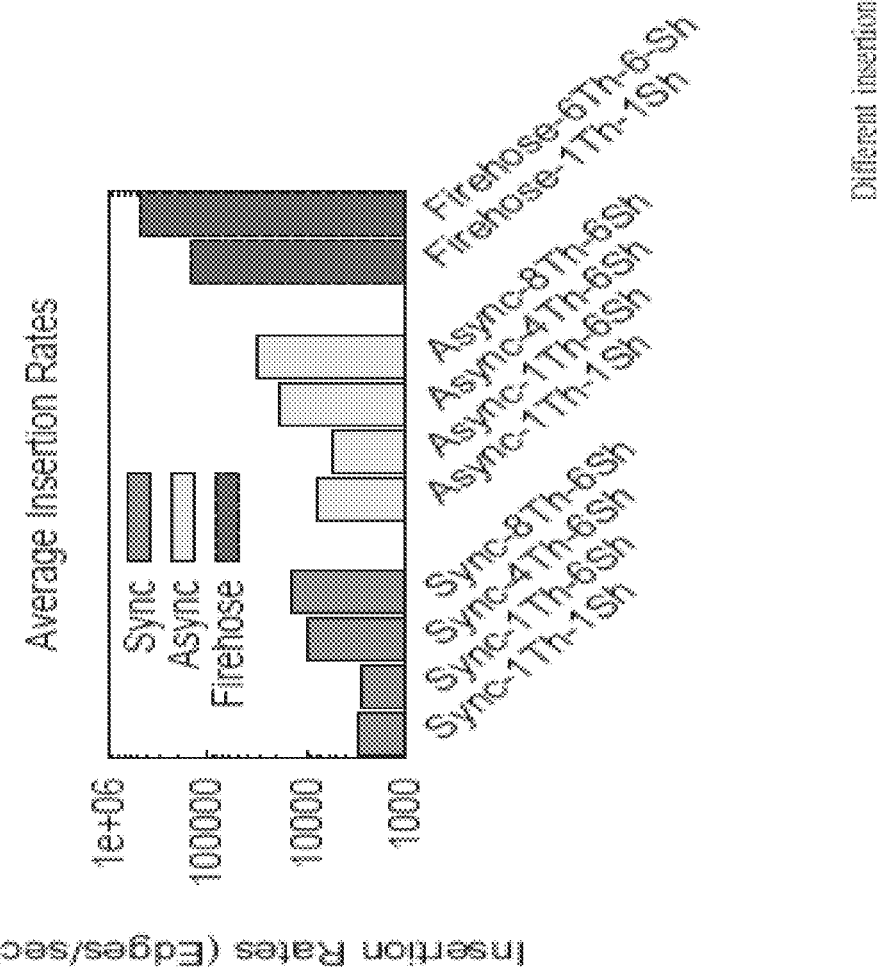
FIG. 21 illustrates example performance results in accordance with one or more embodiments described herein.

FIG. 21 illustrates example performance results in connection with the claimed and disclosed novel subject matter.

Figure 22:
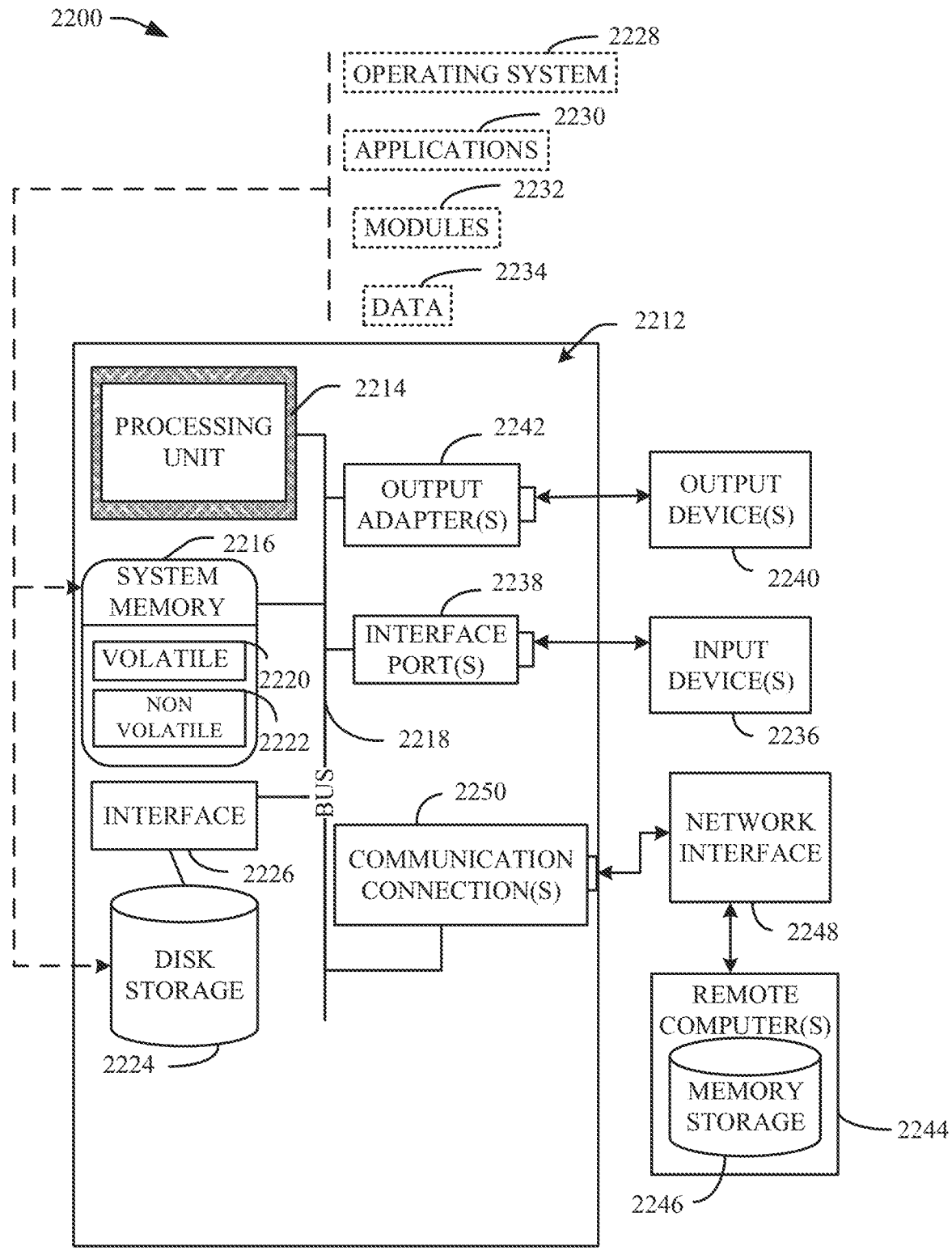
FIG. 22 illustrates a block diagram of an example, non-limiting operating environment in which one or more embodiments described herein can be facilitated.

In order to provide a context for the various aspects of the disclosed subject matter, FIG. 22 as well as the following discussion are intended to provide a general description of a suitable environment in which the various aspects of the disclosed subject matter can be implemented. FIG. 22 illustrates a block diagram of an example, non-limiting operating environment in which one or more embodiments described herein can be facilitated. Repetitive description of like elements employed in other embodiments described herein is omitted for sake of brevity.

With reference to FIG. 22, a suitable operating environment 2200 for implementing various aspects of this disclosure can also include a computer 2212. The computer 2212 can also include a processing unit 2214, a system memory 2216, and a system bus 2218. The system bus 2218 couples system components including, but not limited to, the system memory 2216 to the processing unit 2214. The processing unit 2214 can be any of various available processors. Dual microprocessors and other multiprocessor architectures also can be employed as the processing unit 2214. The system bus 2218 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Firewire (IEEE 1394), and Small Computer Systems Interface (SCSI).

The system memory 2216 can also include volatile memory 2220 and nonvolatile memory 2222. The basic input/output system (BIOS), containing the basic routines to transfer information between elements within the computer 2212, such as during start-up, is stored in nonvolatile memory 2222. Computer 2212 can also include removable/non-removable, volatile/non-volatile computer storage media. FIG. 22 illustrates, for example, a disk storage 2224. Disk storage 2224 can also include, but is not limited to, devices like a magnetic disk drive, floppy disk drive, tape drive, Jaz drive, Zip drive, LS-100 drive, flash memory card, or memory stick. The disk storage 2224 also can include storage media separately or in combination with other storage media. To facilitate connection of the disk storage 2224 to the system bus 2218, a removable or non-removable interface is typically used, such as interface 2226. FIG. 22 also depicts software that acts as an intermediary between users and the basic computer resources described in the suitable operating environment 2200. Such software can also include, for example, an operating system 2228. Operating system 2228, which can be stored on disk storage 2224, acts to control and allocate resources of the computer 2212.

System applications 2230 take advantage of the management of resources by operating system 2228 through program modules 2232 and program data 2234, e.g., stored either in system memory 2216 or on disk storage 2224. It is to be appreciated that this disclosure can be implemented with various operating systems or combinations of operating systems. A user enters commands or information into the computer 2212 through input device(s) 2236. Input devices 2236 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 2214 through the system bus 2218 via interface port(s) 2238. Interface port(s) 2238 include, for example, a serial port, a parallel port, a game port, and a universal serial bus (USB). Output device(s) 2240 use some of the same type of ports as input device(s) 2236. Thus, for example, a USB port can be used to provide input to computer 2212, and to output information from computer 2212 to an output device 2240. Output adapter 2242 is provided to illustrate that there are some output devices 2240 like monitors, speakers, and printers, among other output devices 2240, which require special adapters. The output adapters 2242 include, by way of illustration and not limitation, video and sound cards that provide a means of connection between the output device 2240 and the system bus 2218. It should be noted that other devices and/or systems of devices provide both input and output capabilities such as remote computer(s) 2244.

Computer 2212 can operate in a networked environment using logical connections to one or more remote computers, such as remote computer(s) 2244. The remote computer(s) 2244 can be a computer, a server, a router, a network PC, a workstation, a microprocessor based appliance, a peer device or other common network node and the like, and typically can also include many or all of the elements described relative to computer 2212. For purposes of brevity, only a memory storage device 2246 is illustrated with remote computer(s) 2244. Remote computer(s) 2244 is logically connected to computer 2212 through a network interface 2248 and then physically connected via communication connection 2250. Network interface 2248 encompasses wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL). Communication connection(s) 2250 refers to the hardware/software employed to connect the network interface 2248 to the system bus 2218. While communication connection 2250 is shown for illustrative clarity inside computer 2212, it can also be external to computer 2212. The hardware/software for connection to the network interface 2248 can also include, for exemplary purposes only, internal and external technologies such as, modems including regular telephone grade modems, cable modems and DSL modems, ISDN adapters, and Ethernet cards.

The present invention may be a system, a method, an apparatus and/or a computer program product at any possible technical detail level of integration. The computer program product can include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, etc. that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments in which tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or non-volatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
generating, by a first machine of a plurality of machines associated with a distributed graph database, a quantity of queue pairs on the first machine associated with a target vertex proportional to a quantity of source shards at one or more second machines of the plurality of machines for which there are a plurality of requests to add source vertices to the source shards at the one or more second machines, wherein each queue pair comprises an outgoing edge queue and an incoming edge queue;
placing, by the first machine, respective outgoing edge requests corresponding to the source vertices in associated outgoing edge queues for the source shards associated with the source vertices;
placing, by the first machine, respective incoming edge requests corresponding to the source vertices in associated incoming edge queues for the source shards associated with the source vertices;
generating, by the first machine, respective bulk requests for the source shards to generate the source vertices, wherein the respective bulk requests comprise a target vertex identifier (VIDT) of the target vertex; and
processing, by the first machine, respective responses to the bulk requests from the source shards, the outgoing edge requests, and the incoming edge requests to generate respective tuples for respective outgoing edges and respective incoming edges for the source vertices wherein the respective responses comprise respective source vertex identifiers (VIDS) of the source vertices and respective edge identifier (EID) ranges for source outgoing edge identifiers of the source vertices.

2. The computer-implemented method of claim 1, further comprising:
adding, by the first machine, the target vertex at the first machine; and
generating, by the first machine, the target vertex identifier (VIDT) associated with the target vertex.

3. The computer-implemented method of claim 1, wherein the generating a respective tuple for the outgoing edge and the incoming edge for a source vertex of the source vertices comprises:
adding, by the first machine, an incoming edge tuple {VIDT, a VIDS of the source vertex, a label (LID), an EID from the EID range in the response from the source shard} at the first machine.

4. The computer-implemented method of claim 3, wherein the EID comprises {ShardID, MAXEID}, where ShardID is a shard identifier of the source shard, and MAXEID is a number.

5. The computer-implemented method of claim 1, wherein a maximum of three communication steps are performed per added new edge to the distributed graph database.

6. The computer-implemented method of claim 1, wherein a maximum of four communication steps are performed per added edge to the distributed graph database, and further comprising sending a confirmation to a client initiating a request of the plurality of requests to add the source vertices.

7. The computer-implemented method of claim 1, wherein one or more vertices or edges is associated with a string label that can be used to categorize vertices or edges and facilitate efficient traversal.

8. A machine, comprising:
a processor, operatively coupled to at least one memory, to execute the following computer executable components stored in the memory:
a graph database component that:
generates a quantity of queue pairs on the machine associated with a target vertex proportional to a quantity of shards source shards at one or more other machines for which there are a plurality of requests to add source vertices to the source shards at the one or more other machines, wherein each queue pair comprises an outgoing edge queue and an incoming edge queue, and wherein the plurality of machines are associated with a distributed graph database;
places respective outgoing edge requests corresponding to the source vertices in associated outgoing edge queues for the source shards associated with the source vertices;
places respective incoming edge requests corresponding to the source vertices in associated incoming edge queues for the source shards associated with the source vertices;

generates respective bulk requests for the source shards to generate the source vertices, wherein the respective bulk requests comprise a target vertex identifier (VIDT) of the target vertex; and processes respective responses to the bulk requests from the source shards, the outgoing edge requests, and the incoming edge requests to generate respective tuples for respective outgoing edges and respective incoming edges for the source vertices, wherein the respective responses comprise respective source vertex identifiers (VIDS) of the source vertices and respective edge identifier (EID) ranges for source outgoing edge identifiers of the source vertices.

9. The machine of claim 8, wherein the graph database component adds the target vertex at the first machine; and generates the target vertex identifier (VIDT) associated with the target vertex.

10. The machine of claim 8, wherein the graph database component generates a respective tuple for the outgoing edge and the incoming edge for a source vertex of the source vertices further comprising:

adds an incoming edge tuple {VIDT, a VIDS of the source vertex, a label (LID), an EID from the EID range in the response from the source shard} at the first machine.

11. The machine of claim 10, wherein the EID comprises {ShardID, MAXEID}, where ShardID is a shard identifier of the source shard, and MAXEID is a number.

12. The machine of claim 8, wherein a maximum of three communication steps are performed per added new edge to the distributed graph database.

13. The machine of claim 8, wherein a maximum of four communication steps are performed per added edge to the distributed graph database, and the graph database component further sends a confirmation to a client initiating a request of the plurality of requests to add the source vertices.

14. The machine of claim 8, wherein one or more vertices or edges is associated with a string label that can be used to categorize vertices or edges and facilitate efficient traversal.

15. A computer program product that reduces number of messages to add a new edge to a distributed graph database across a plurality of machines by employing asynchronous communication, the computer program product comprising a computer readable storage medium having program instructions embodied therewith, the program instructions executable by a processing component of a first machine of the plurality of machines to cause the processing component to:

generate a quantity of queue pairs on the first machine associated with a target vertex proportional to a quantity of source shards at one or more second machines of the plurality of machines for which there are a plurality of requests to add source vertices to the source shards at the one or more second machines, wherein each queue pair comprises an outgoing edge queue and an incoming edge queue;

place respective outgoing edge requests corresponding to the source vertices in associated outgoing edge queues for the source shards associated with the source vertices;

place respective incoming edge requests corresponding to the source vertices in associated incoming edge queues for the source shards associated with the source vertices;

generate respective bulk requests for the source shards to generate the source vertices, wherein the respective bulk requests comprise a target vertex identifier (VIDT) of the target vertex; and process respective responses to the bulk requests from the source shards, the outgoing edge requests, and the incoming edge requests to generate respective tuples for respective outgoing edges and respective incoming edges for the source vertices, wherein the respective responses comprise respective source vertex identifiers (VIDS) of the source vertices and respective edge identifier (EID) ranges for source outgoing edge identifiers of the source vertices.

16. The computer program product of claim 15, wherein the program instructions are further executable to cause the processing component to add the target vertex at the first machine; and generate the target vertex identifier (VIDT) associated with the target vertex.

17. The computer program product of claim 15, wherein the processing component generates a respective tuple for the outgoing edge and the incoming edge for a source vertex of the source vertices further comprising:

add an incoming edge tuple {VIDT, a VIDS of the source vertex, a label (LID), an EID from the EID range in the response from the source shard} at the first machine.

18. The computer program product of claim 17 wherein the EID comprises {ShardID, MAXEID}, wherein ShardID is a shard identifier of the source shard, and MAXEID is a number.

19. The computer program product of claim 15, wherein the program instructions are further executable by the processing component to cause the processing component to perform a maximum of three communication steps per added edge to the distributed graph database.

20. The computer program product of claim 15, wherein the program instructions are further executable by the processing component to cause the processing component to perform a maximum of four communication steps per added edge to the distributed graph database, and the processing component further sends a confirmation to a client initiating a request of the plurality of requests to add the source vertices.

* * * * *